(12) United States Patent
Sonoda et al.

(10) Patent No.: US 8,019,181 B2
(45) Date of Patent: Sep. 13, 2011

(54) IMAGE GENERATION APPARATUS, IMAGE PROCESSING APPARATUS, COMPUTER READABLE MEDIUM AND COMPUTER DATA SIGNAL

(75) Inventors: Takashi Sonoda, Kanagawa (JP); Takeshi Onishi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 1112 days.

(21) Appl. No.: 11/785,330

(22) Filed: Apr. 17, 2007

(65) Prior Publication Data

US 2008/0101702 A1    May 1, 2008

(30) Foreign Application Priority Data

Oct. 30, 2006  (JP) ................................. 2006-295009

(51) Int. Cl.
  *G06K 9/32*  (2006.01)
(52) U.S. Cl. ......... 382/297; 382/296; 382/199; 358/474
(58) Field of Classification Search .......................... None
  See application file for complete search history.

(56) References Cited

U.S. PATENT DOCUMENTS

| | | | | |
|---|---|---|---|---|
| 4,924,078 A * | 5/1990 | Sant'Anselmo et al. | ..... | 235/494 |
| 5,548,407 A * | 8/1996 | von Kienlin et al. | ......... | 358/1.9 |
| 5,726,435 A * | 3/1998 | Hara et al. | .................... | 235/494 |
| 5,915,042 A * | 6/1999 | Matsushiro | ................... | 382/232 |
| 6,052,813 A | 4/2000 | Nagasaki et al. | | |
| 6,302,329 B1 * | 10/2001 | Iwai et al. | .................... | 235/494 |
| 6,432,518 B1 | 8/2002 | Torii et al. | | |
| 6,532,301 B1 * | 3/2003 | Krumm et al. | ................ | 382/170 |
| 6,857,571 B2 * | 2/2005 | Walmsley et al. | ......... | 235/462.1 |
| 6,859,155 B2 * | 2/2005 | Kondo et al. | ................. | 341/106 |
| 6,985,626 B2 * | 1/2006 | Mitsui | ........................... | 382/201 |
| 7,376,289 B2 * | 5/2008 | Tsumura et al. | .............. | 382/305 |
| 7,852,520 B2 * | 12/2010 | Iida | ............................... | 358/474 |
| 2004/0085287 A1 | 5/2004 | Wang et al. | | |

(Continued)

FOREIGN PATENT DOCUMENTS

EP          0 780 790 A2     6/1997

(Continued)

OTHER PUBLICATIONS

Takeshi Onishi et al., "Image Generation Apparatus, Computer Readable Medium, Computer Data Signal, Information Generation Method, Information Reading System, Electronic Pen and Recording Medium," Unpublished U.S. Appl. No. 11/785,333, filed Apr. 17, 2007.

(Continued)

*Primary Examiner* — Samir A Ahmed
*Assistant Examiner* — Jayesh Patel
(74) *Attorney, Agent, or Firm* — Morgan, Lewis & Bockius LLP

(57) ABSTRACT

An image generation apparatus includes an acquisition unit and a generation unit. The acquisition unit acquires information to be embedded in each of a plurality of partitions on a recording medium. The generation unit generates an image in which first pattern images representing the information and a second pattern image controlling acquisition of the information from the first pattern images are placed in each of the plurality of partitions. The first and second pattern images are ones of $_mC_n$ pattern images which are obtained by placing a unit image in n points selected from among m points where m and n are natural numbers, $m \geq 4$, and $2 \leq n < m$.

9 Claims, 36 Drawing Sheets

U.S. PATENT DOCUMENTS

| | | |
|---|---|---|
| 2005/0201621 A1 | 9/2005 | Wang et al. |
| 2006/0203314 A1 | 9/2006 | Onishi |

FOREIGN PATENT DOCUMENTS

| | | |
|---|---|---|
| JP | 6-231466 A | 8/1994 |
| JP | 9-185669 A | 7/1997 |
| JP | 2000-293303 A | 10/2000 |
| JP | 2003-511762 T | 3/2003 |
| JP | 2004-152273 A | 5/2004 |
| JP | 2005-092438 | 4/2005 |
| JP | 2005-235185 A | 9/2005 |
| JP | 2006-85679 A | 3/2006 |
| JP | 2006-254299 | 9/2006 |
| WO | WO 01/26032 A1 | 4/2001 |
| WO | WO 01/26033 A1 | 4/2001 |
| WO | WO 01/26034 A1 | 4/2001 |
| WO | WO 0126034 A1 * | 4/2001 |

OTHER PUBLICATIONS

Takeshi Onishi et al., "Image Generation Apparatus and Recording Medium," Unpublished U.S. Appl. No. 11/785,324, filed Apr. 17, 2007.

Takeshi Onishi et al., "Image Processing Apparatus, Computer Readable Medium, and Computer Data Signal," Unpublished U.S. Appl. No. 11/785,329, filed Apr. 17, 2007.

* cited by examiner

9C2: PLACE TWO DOTS IN 9-DOT AREA

COVERAGE: 5.56%

INFORMATION AMOUNT: 0.036 BIT/PIXEL

12 PIXELS

9C3: PLACE THREE DOTS IN 9-DOT AREA

COVERAGE: 8.33%

INFORMATION AMOUNT: 0.044 BIT/PIXEL

12 PIXELS

4C1: PLACE ONE DOT IN 4-DOT AREA

COVERAGE: 6.25%

INFORMATION AMOUNT: 0.031 BIT/PIXEL

8 PIXELS

4C2: PLACE TWO DOTS IN 4-DOT AREA

COVERAGE: 12.5%

INFORMATION AMOUNT: 0.04 BIT/PIXEL

8 PIXELS

16C2: PLACE TWO DOTS IN 16-DOT AREA

16 PIXELS

COVERAGE: 3.13%

INFORMATION AMOUNT: 0.027 BIT/PIXEL

16C3: PLACE THREE DOTS IN 16-DOT AREA

16 PIXELS

COVERAGE: 4.69%

INFORMATION AMOUNT: 0.036 BIT/PIXEL 36 (= 9C2) PATTERNS CAN BE REPRESENTED.

84 (= 9C2) PATTERNS CAN BE REPRESENTED.

FIG. 3C
9C1 9 PATTERNS
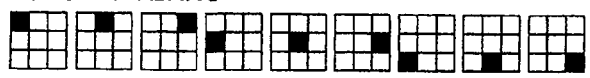
9C4 126 PATTERNS
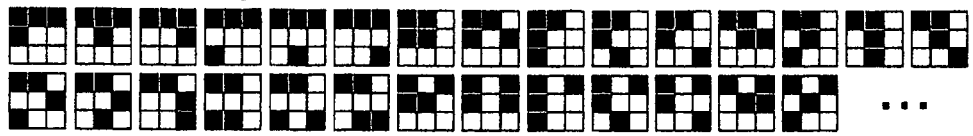
9C5 126 PATTERNS
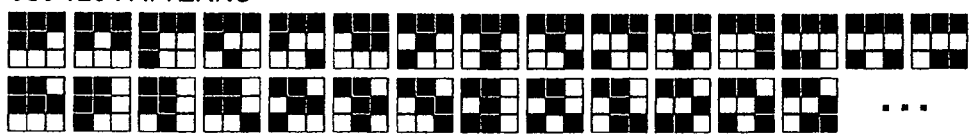
9C6 84 PATTERNS
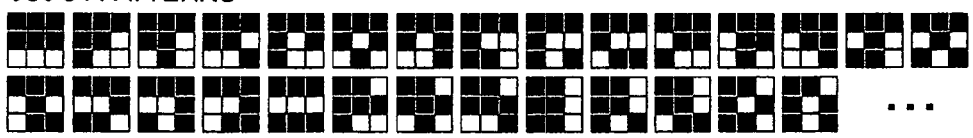
9C7 36 PATTERNS
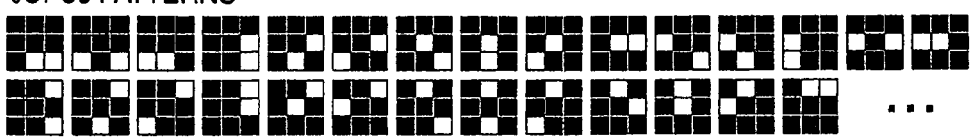
9C8 9 PATTERNS

6C2: PLACE TWO DOTS IN 6-DOT AREA

COVERAGE: 8.33%

INFORMATION AMOUNT: 0.041 BIT/PIXEL

12 PIXELS

6C3: PLACE THREE DOTS IN 6-DOT AREA

COVERAGE: 12.5%

INFORMATION AMOUNT: 0.045 BIT/PIXEL

12 PIXELS

12C2: PLACE TWO DOTS IN 12-DOT AREA

COVERAGE: 4.17%

INFORMATION AMOUNT: 0.031 BIT/PIXEL

16 PIXELS

12C3: PLACE THREE DOTS IN 12-DOT AREA

COVERAGE: 6.25%

INFORMATION AMOUNT: 0.041 BIT/PIXEL

16 PIXELS

12C4: PLACE FOUR DOTS IN 12-DOT AREA

COVERAGE: 8.33%
INFORMATION AMOUNT: 0.047 BIT/PIXEL

16 PIXELS

12C5: PLACE FIVE DOTS IN 12-DOT AREA

COVERAGE: 10.41%
INFORMATION AMOUNT: 0.05 BIT/PIXEL

16 PIXELS 15 (= 6C2) PATTERNS CAN BE REPRESENTED.

20 (= 6C3) PATTERNS CAN BE REPRESENTED.

66 (= 12C2) PATTERNS CAN BE REPRESENTED.

220 (= 12C3) PATTERNS CAN BE REPRESENTED.

PATTERN 32
SYNCHRONOUS
CODE

PATTERN 33
90-DEGREE
ROTATION TO
RIGHT

PATTERN 34
180-DEGREE
ROTATION TO
RIGHT

PATTERN 35
270-DEGREE
ROTATION TO
RIGHT

PATTERN 64
SYNCHRONOUS
CODE

PATTERN 65
180-DEGREE
ROTATION

FIG. 10

| NUMBER OF PLACEABLE DOTS (m) | NUMBER OF PLACED DOTS (n) | TOTAL NUMBER OF PATTERNS (mCn) | DISTRIBUTION NO. | NUMBER OF INFORMATION PATTERNS | NUMBER OF BITS | NUMBER OF SYNCHRONOUS PATTERNS | NUMBER OF SETS |
|---|---|---|---|---|---|---|---|
| 9 (3 x 3) | 2 | 36 | 1 | 32 | 5 | 4 | 1 |
| | | | 2 | 16 + 16 | 4 | 4 | 1 |
| | | | 3 | 16 | 4 | 20 | 5 |
| | 3 | 84 | 1 | 64 | 6 | 20 | 5 |
| | | | 2 | 32 + 32 | 5 | 20 | 5 |
| 12 (3 x 4) | 2 | 66 | 1 | 64 | 6 | 2 | 1 |
| | | | 2 | 32 + 32 | 5 | 2 | 1 |
| | | | 3 | 32 | 5 | 34 | 17 |
| | 3 | 220 | 1 | 128 + 64 | 7/6 | 28 | 14 |
| | | | 2 | 128 | 7 | 92 | 46 |
| | 4 | 495 | 1 | 256 + 128 + 64 | 8/7/6 | 46 | 23 |
| | | | 2 | 256 + 128 | 8/7 | 110 | 55 |

9C3: PLACE THREE DOTS
IN 9-DOT AREA

COVERAGE: 8.33%

84 PATTERNS IN TOTAL

64 CODE PATTERNS
(SIX BITS)

20 SYNCHRONOUS
PATTERNS (FIVE SETS)

← 12 PIXELS →

SYNCHRONOUS   X POSITION

IDENTIFICATION

SYNCHRONOUS  X POSITION

IDENTIFICATION

SYNCHRONOUS

IDENTIFICATION

SYNCHRONOUS

IDENTIFICATION

12C4: PLACE FOUR DOTS
IN 12-DOT AREA

16 PIXELS

FIG. 18

| m \ n | 1 | 2 | 3 | 4 | 5 | 6 | 7 | 8 | 9 | 10 | 11 |
|---|---|---|---|---|---|---|---|---|---|---|---|
| 4 | 0.25 | 0.5 | 0.75 | ... | | | | | | | |
| 6 | 0.166 | 0.333 | 0.5 | 0.667 | 0.833 | ... | | | | | |
| 8 | 0.125 | 0.25 | 0.375 | 0.5 | 0.625 | 0.75 | 0.875 | | | | |
| 9 | 0.111 | 0.222 | 0.333 | 0.444 | 0.556 | 0.667 | 0.778 | 0.889 | ... | | |
| 12 | 0.083 | 0.167 | 0.25 | 0.333 | 0.417 | 0.5 | 0.583 | 0.667 | 0.75 | 0.833 | 0.916 |
| 16 | 0.063 | 1.125 | 0.188 | 0.25 | 0.313 | 0.375 | 0.438 | 0.5 | 0.563 | 0.625 | 0.688 |

IMAGE GENERATION APPARATUS, IMAGE PROCESSING APPARATUS, COMPUTER READABLE MEDIUM AND COMPUTER DATA SIGNAL

CROSS-REFERENCE TO RELATED APPLICATIONS

This application is based on and claims priority under 35 U.S.C. §119 from Japanese Patent Application No. 2006-295009 filed Oct. 30, 2006.

BACKGROUND

Technical Field

The invention relates to an image generation apparatus, an image processing apparatus, a computer readable medium and a computer data signal.

SUMMARY

According to an aspect of the invention, an image generation apparatus includes an acquisition unit and a generation unit. The acquisition unit acquires information to be embedded in each of a plurality of partitions on a recording medium. The generation unit generates an image in which first pattern images representing the information and a second pattern image controlling acquisition of the information from the first pattern images are placed in each of the plurality of partitions. The first and second pattern images are ones of $_mC_n$ pattern images which are obtained by placing a unit image in n points selected from among m points where m and n are natural numbers, $m \geq 4$, and $2 \leq n < m$.

BRIEF DESCRIPTION OF THE DRAWINGS

Exemplary embodiments of the invention will be described below in detail with reference to the accompanying drawings, wherein:

FIG. 3C is a drawing to show other examples of the unit code patterns in the $_9C_n$ system;

FIG. 10 is a drawing to show variations of distribution into information patterns and synchronous patterns;

FIG. 18 is a drawing to show a dot density table referred to in the exemplary embodiment of the invention;

DETAILED DESCRIPTION

Exemplary embodiments of the invention will be described in detail with reference to the accompanying drawings.

In the exemplary embodiment, $_mC_n$ ($=m!/\{(m-n)!\times n!\}$) pieces of information are represented by pattern images (which will be hereinafter referred to as "unit code pattern") having unit images placed in n ($1 \leq n < m$) points selected from among m ($m \geq 3$) points. This means that plural unit images rather than one unit image are associated with information. If it is assumed that one unit image is associated with information, when the unit image is broken or noise is added there to, erroneous information is represented. In contrast, for example, if it is assumed that two unit images are associated with information, when the number of unit images is one or three, an error is easily detected. Further, in a method of representing one bit or two bits at most by one unit image, a pattern similar to a pattern representing information cannot represent a synchronous pattern which controls reading of the pattern representing the information. Thus, in the exemplary embodiment, a coding system as described above is adopted. Hereinafter, such a coding system may be referred to as an "$_mC_n$ system."

Here, an image of any shape may be used as the unit image. In the exemplary embodiment, a dot image (may be simply referred to as a "dot") is used as an example of the unit image, but an image of any other shape such as a slanting line pattern may be used.

FIGS. 1A to 2D show examples of unit code patterns in the $_mC_n$ system.

Figure 1A:
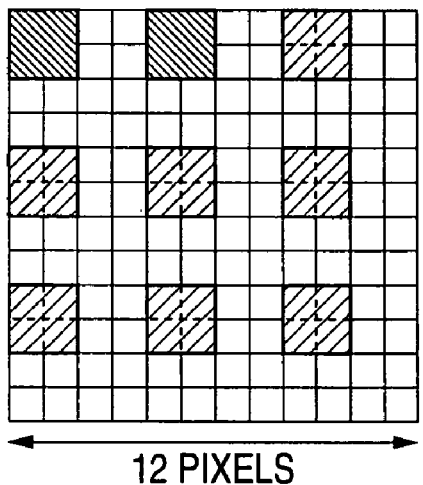
FIG. 1A is a drawing to show an example of a unit code pattern in a $_9C_n$ system.
Figure 1B:
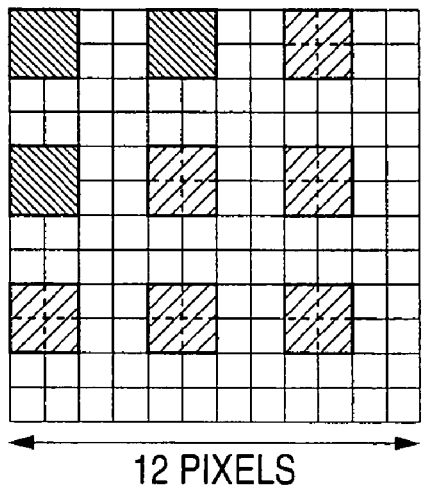
FIG. 1B is a drawing to show another example of the unit code pattern in the $_9C_n$ system.

FIG. 1 shows examples wherein an area where a total of nine dots consisting of three dots in height by three dots in width can be placed is provided. FIG. 1A shows a unit code pattern in a $_9C_2$ system wherein two dots are placed in the area where nine dots can be placed, and FIG. 1B shows a unit code pattern in a $_9C_3$ system wherein three dots are placed in the area where nine dots can be placed.

In FIG. 1, the size of one dot (the size of a black quadrangle) is two pixels by two pixels in 600 dpi. Since the size of one pixel in 600 dpi is 0.0423 mm, one side of the black quadrangle is 84.6 μm ($=0.0423$ mm$\times 2$). The dots making up the unit code pattern may be small as much as possible because the dots become more conspicuous as the dots become larger. However, if each dot is made too small, it cannot be printed with a printer. Then, the above-mentioned value which is larger than 50 μm and which is smaller than 100 μm is adopted as the size of the dot. Therefore, the size of the unit code pattern in the $_9C_n$ system is 12 pixels by 12 pixels in 600 dpi (0.5076 mm$\times 0.5076$ mm). The above-mentioned dot size 84.6 μm is a numeric value on calculation and the dot size becomes about 100 μm in an actually printed toner image.

Figure 2A:
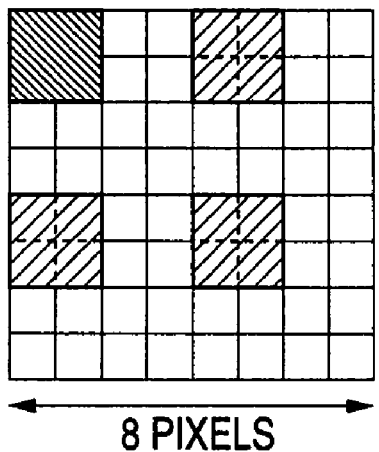
FIG. 2A is a drawing to show an example of a unit code pattern in a $_4C_n$ system.
Figure 2B:
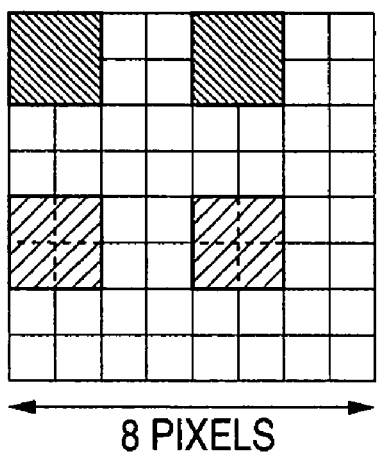
FIG. 2B is a drawing to show another example of the unit code pattern in the $_4C_n$ system.
Figure 2C:
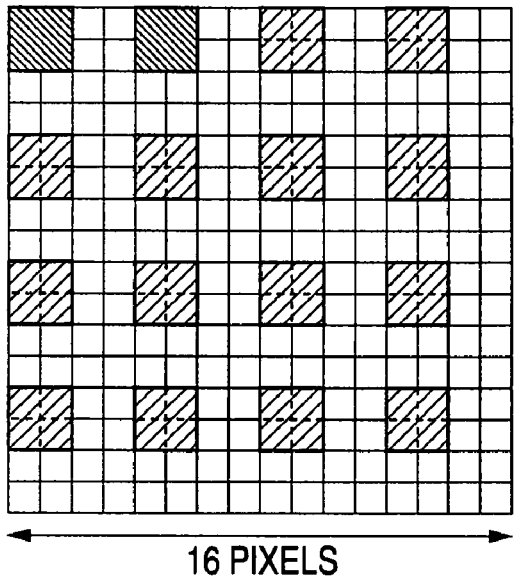
FIG. 2C is a drawing to show an example of a unit code pattern in a $_{16}C_n$ system.
Figure 2D:
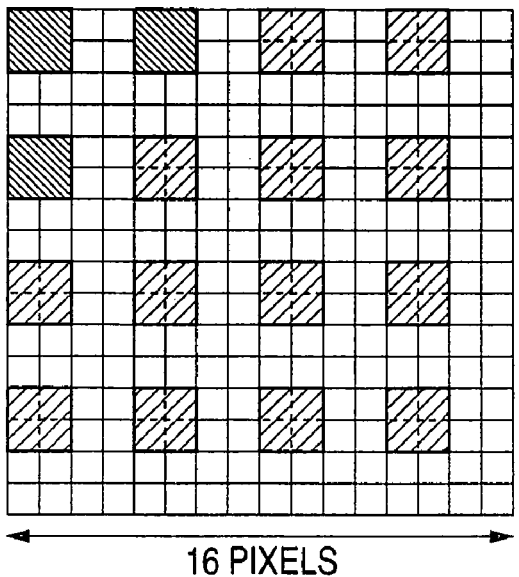
FIG. 2D is a drawing to show another example of the unit code pattern in a $_{16}C_n$ system.

FIG. 2A shows a unit code pattern in a $_4C_1$ system, and FIG. 2B shows a unit code pattern in a $_4C_2$ system. FIG. 2C shows a unit code pattern in a $_{16}C_2$ system, and FIG. 2D shows a unit code pattern in a $_{16}C_3$ system.

Figure 3A:
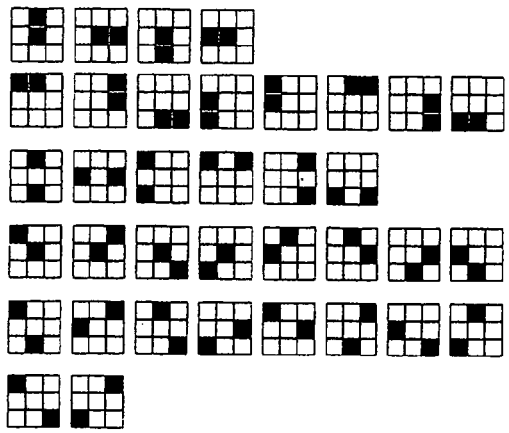
FIG. 3A is a drawing to show other examples of the unit code patterns in the $_9C_n$ system.
Figure 3B:
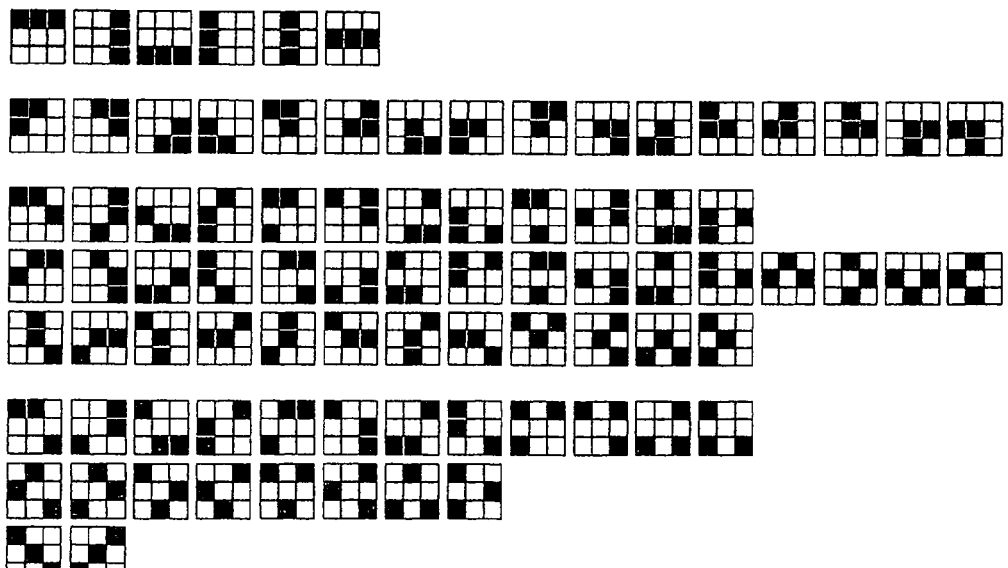
FIG. 3B is a drawing to show further other example of the unit code patterns in the $_9C_n$ system.
Figure 4:
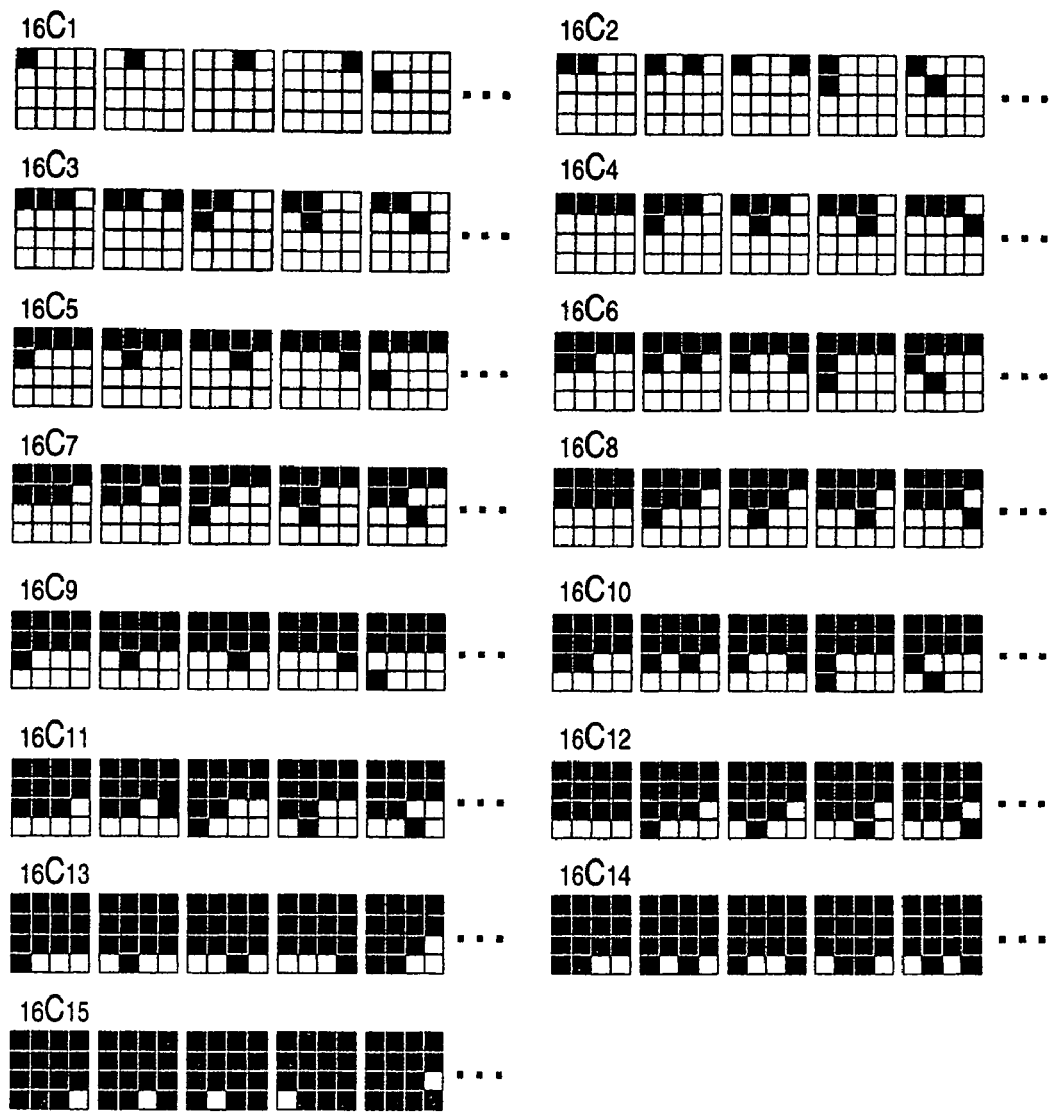
FIG. 4 is a drawing to show other examples of the unit code patterns in the $_{16}C_n$ system.

FIGS. 3A to 4 show other examples of unit code patterns. In FIGS. 3A to 4, space between dots is not shown.

FIG. 3A shows all unit code patterns in the $_9C_2$ system shown in FIG. 1A. In the $_9C_2$ system, 36 ($=_9C_2$) pieces of information is represented by the unit code patterns. FIG. 3B shows all unit code patterns in the $_9C_3$ system shown in FIG. 1B. In the $_9C_3$ system, 84 ($=_9C_3$) pieces of information is represented by the unit code patterns. Further, FIG. 3C shows examples of unit code patterns in other $_9C_n$ systems.

FIG. 4 shows examples of unit code patterns in $_{16}C_n$ systems.

The unit code patterns are not limited to those with m=4, 9 or 16. Any other value may be adopted as m. Any value may also be adopted as n if m and n satisfies $1 \leq n < m$.

By the way, so far square numbers (square of integer) have been adopted as m, but product of two different integers may be adopted as m. This means that the area where dots can be placed is not limited to a square area like the case where three dots by three dots are placed, and may be a rectangular area like the case where three dots by four dots are placed. In the specification, the "rectangle" refers to a rectangle having two adjacent sides which are different in length.

FIGS. 5A to 6D show examples of unit code patterns in this case.

Figure 5A:
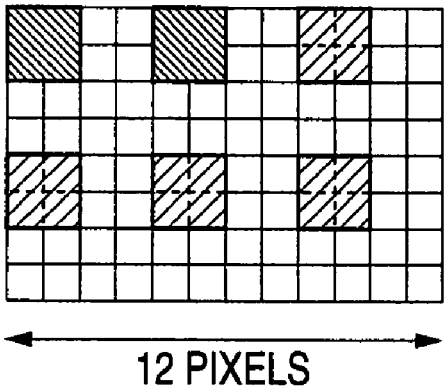
FIG. 5A is a drawing to show examples of unit code patterns in a $_6C_n$ system.
Figure 5B:
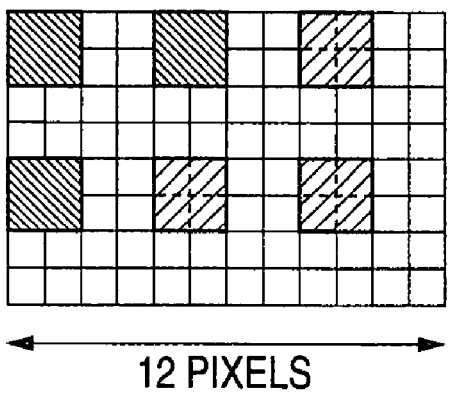
FIG. 5B is a drawing to show other examples of the unit code patterns in the $_6C_n$ system.

FIG. 5A shows a unit code pattern in a $_6C_2$ system, and FIG. 5B shows a unit code pattern in a $_6C_3$ system.

Figure 6A:
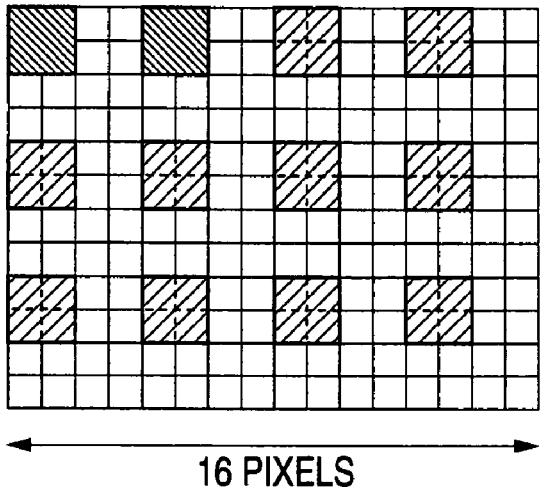
FIG. 6A is a drawing to show examples of unit code patterns in a $_{12}C_n$ system.
Figure 6B:
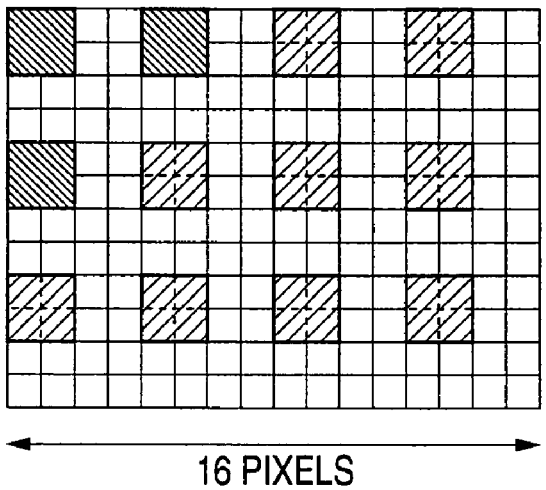
FIG. 6B is a drawing to show other examples of the unit code patterns in the $_{12}C_n$ system.
Figure 6C:
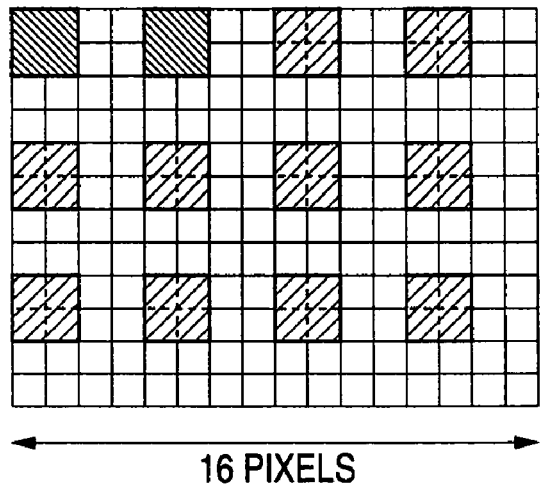
FIG. 6C is a drawing to show further other examples of the unit code patterns in the $_{12}C_n$ system.
Figure 6D:
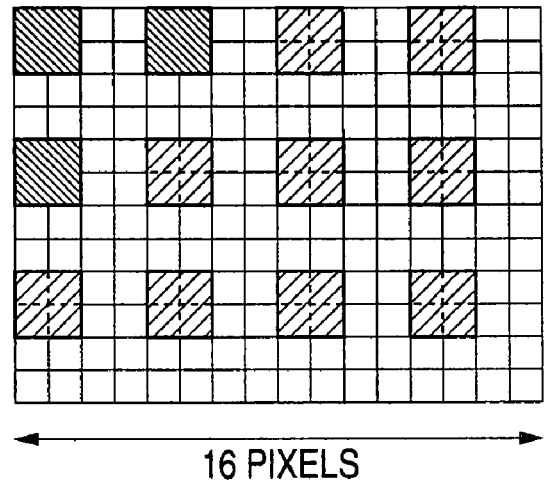
FIG. 6D is a drawing to show still further other examples of the unit code patterns in the $_{12}C_n$ system.

FIG. 6A shows a unit code pattern in a $_{12}C_2$ system, and FIG. 6B shows a unit code pattern in a $_{12}C_3$ system. FIG. 6C shows a unit code pattern in a $_{12}C_4$ system, and FIG. 6D shows a unit code pattern in a $_{12}C_5$ system.

FIGS. 7A to 8B show other examples of unit code patterns. In FIGS. 7A to 8B, space between dots is not shown.

Figure 7A:
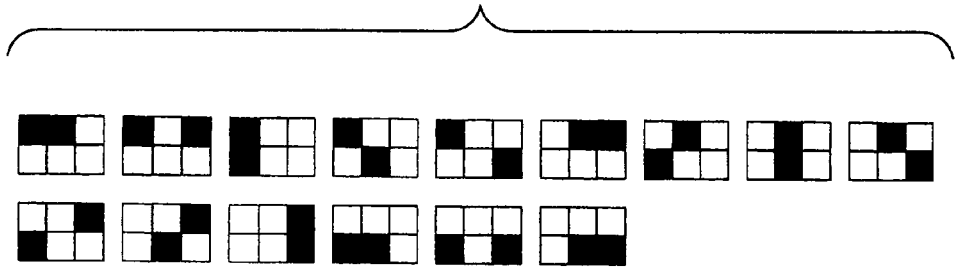
FIG. 7A is a drawing to show other examples of unit code patterns in the $_6C_n$ system.
Figure 7B:
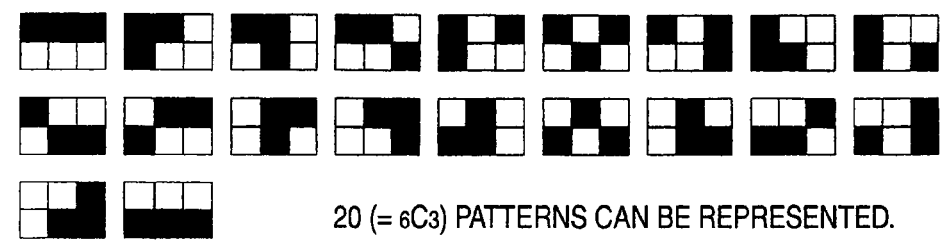
FIG. 7B is a drawing to show further other examples of the unit code patterns in the $_6C_n$ system.
Figure 8A:
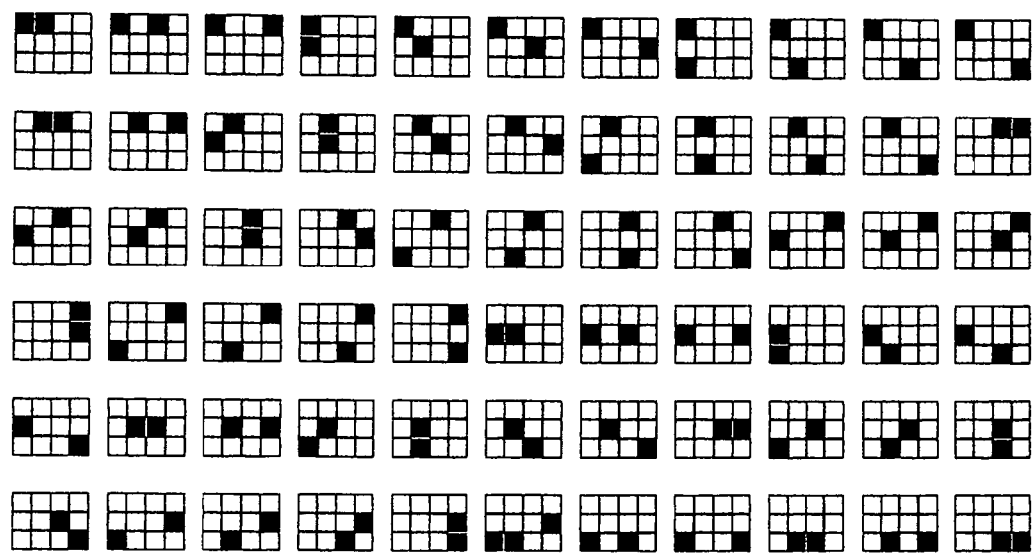
FIG. 8A is a drawing to show other examples of unit code patterns in the $_{12}C_n$ system.
Figure 8B:
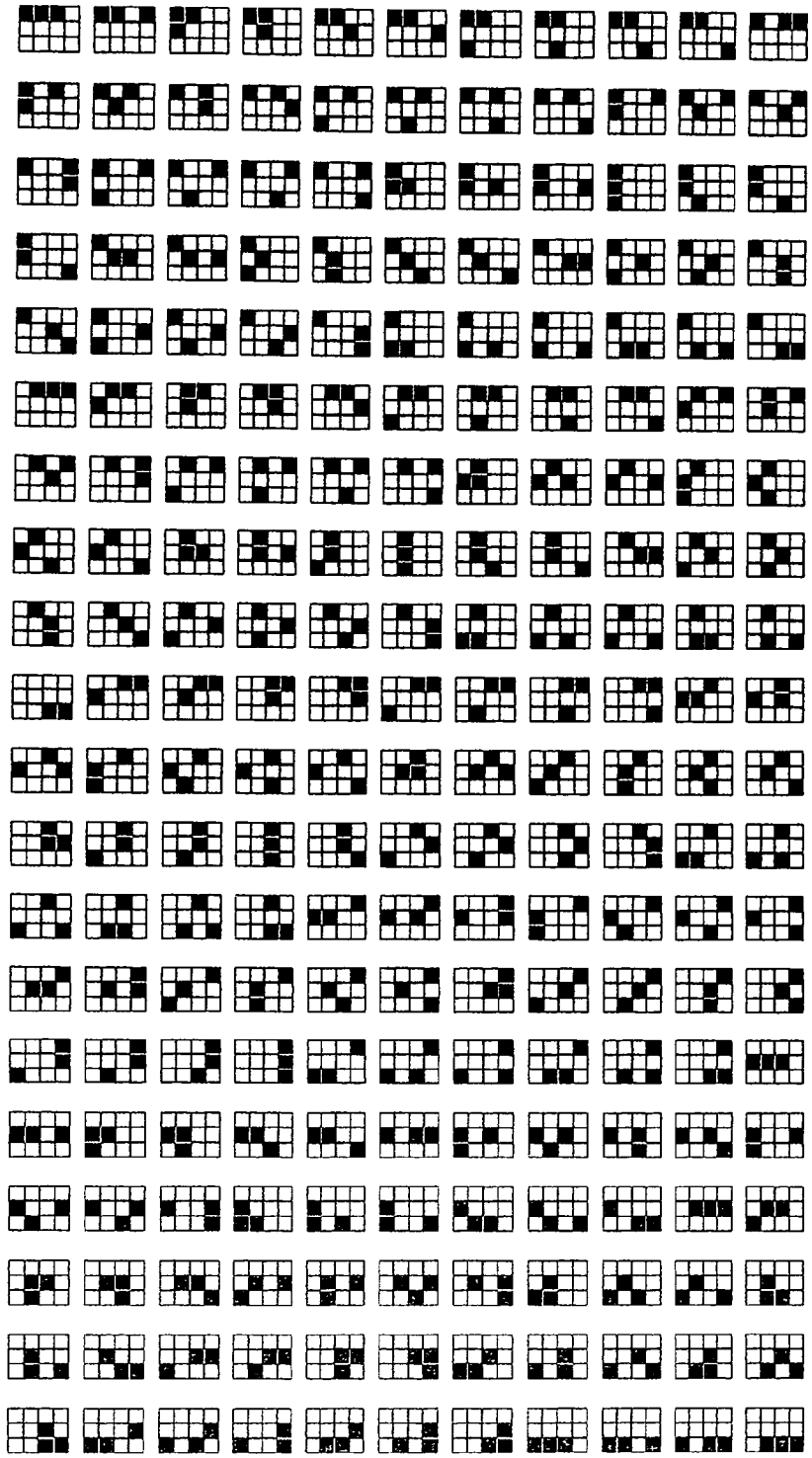
FIG. 8B is a drawing to show further other examples of the unit code patterns in the $_{12}C_n$ system.

FIG. 7A shows all unit code patterns in the $_6C_2$ system. FIG. 7B shows all unit code patterns in the $_6C_3$ system. FIG. 8A shows all unit code patterns in the $_{12}C_2$ system shown in FIG. 6A. In the $_{12}C_2$ system, 66 ($=_{12}C_2$) pieces of information are represented by the unit code patterns. FIG. 8B shows all unit code patterns in the $_{12}C_3$ system. In the $_{12}C_3$ system, 220 ($=_{12}C_3$) pieces of information are represented by the unit code patterns.

The unit code patterns are not limited to those with m=6 or 12. Any other value may be adopted as m. Any value may also be adopted as n if m and n satisfy $1 \leq n < m$.

Thus, $_mC_n$ kinds of unit code patterns are provided by selecting n points from among m points. In the exemplary embodiment, specific patterns of the unit code patterns are used as information patterns and the remaining patterns are used as synchronous patterns. The "information pattern" is a pattern that represents information to embedded in a recording medium. The "synchronous pattern" is a pattern that is used to extract the information from the information pattern. For example, the synchronous pattern is used to specify an information reading position or to detect rotation of an image. Any may be used as the recording medium if it is a medium on which an image can be printed; paper, an OHP sheet, and the like are illustrated.

In the exemplary embodiment, the information pattern is provided as an example of first pattern images representing information, and the synchronous pattern is provided as an example of a second pattern image that controls reading of the first pattern images.

FIG. 9 shows examples of the synchronous patterns.

Figure 9A:
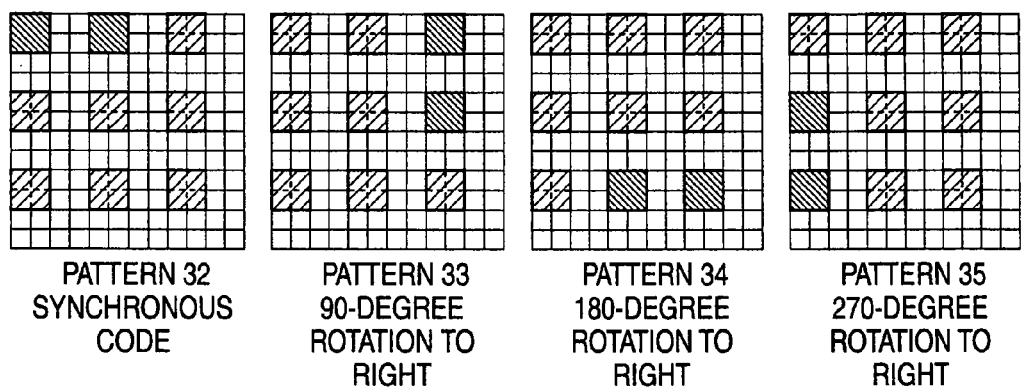
FIG. 9A is a drawing to show examples of synchronous patterns.

FIG. 9A shows examples of the synchronous patterns in the $_9C_2$ system. Thus, if m in the $_mC_n$ system is a square number, it is necessary to provide four kinds of unit code patterns as synchronous patterns to detect rotation of an image. Here, a unit code pattern having a pattern value of 32 is adopted as an erecting synchronous pattern. A unit code pattern having a pattern value of 33 is used as a synchronous pattern rotated 90 degrees to the right, a unit code pattern having a pattern value of 34 is used as a synchronous pattern rotated 180 degrees to the right, and a unit code pattern having a pattern value of 35 is used as a synchronous pattern rotated 270 degrees to the right. In this case, the unit code patterns resulting from excluding the four kinds of unit code patterns from the 36 kinds of unit code patterns may be used as information patterns to represent 5-bit information. However, how to distribute the 36 kinds of unit code patterns into the information patterns and the synchronous patterns is not limited to this example. For example, five sets of synchronous patterns each made up of four kinds of unit code patterns may be provided and the remaining 16 kinds of unit code patterns may be used as information patterns to represent 4-bit information. If a plural sets of synchronous patterns are thus provided, for example, an information representing method that uses the information patterns is selected according to a set to which the synchronous pattern belongs.

Figure 9B:
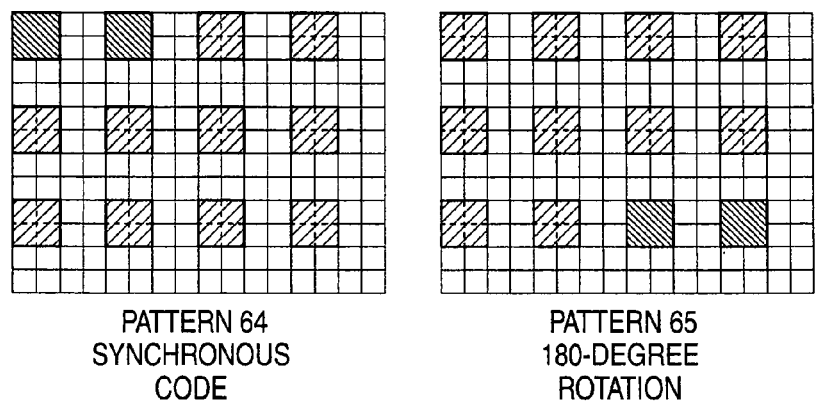
FIG. 9B is a drawing to show other examples of synchronous patterns.

FIG. 9B shows examples of synchronous patterns in the $_{12}C_2$ system. Thus, if m in $_mC_n$ is the product of two different integers, two kinds of unit code patterns may be provided as synchronous patterns to detect rotation of an image. For example, although an area where three dots in height by four dots in width can be placed as in FIG. 9B should be detected, if an area where four dots in height by three dots in width can be placed is detected, it can be seen at this point in time that the image is rotated 90 degrees or 270 degrees. Here, a unit code pattern having a pattern value of 64 is adopted as an erect synchronous pattern, and a unit code pattern having a pattern value of 65 is used as a synchronous pattern rotated 180 degrees. In this case, the unit code patterns resulting from excluding the two kinds of unit code patterns from the 66 kinds of unit code patterns may be used as information patterns to represent 6-bit information. However, also in this case, how to distribute the 66 kinds of unit code patterns into the information patterns and the synchronous patterns is not limited to this example. For example, the 34 kinds of unit code patterns may be used as 17 sets of synchronous patterns and the remaining 32 kinds of unit code patterns may be used as information patterns to represent 5-bit information.

Distribution of the unit code patterns into the information patterns and the synchronous patterns will be described in more detail.

FIG. 10 is a table to show examples of the distribution methods.

This table first shows the number of placeable dots (m) in an area where dots can be placed, the number of dots (n) actually placed in the area where dots can be placed, and the total number of unit code patterns ($_mC_n$) in the $_mC_n$ system.

Some distribution methods are illustrated for the same $_mC_n$ system. The distribution No., the number of information patterns, the number of bits, the number of synchronous patterns, and the number of sets are shown for each distribution method. The number of information patterns is $2^{p1}+2^{p2}+\ldots +2^{pr}$. This means that r groups each made consisting of two's power information patterns are provided. The number of synchronous patterns is 4q or 2q. If m is a square number, four kinds of synchronous patterns make up one set as described above and thus, the number of synchronous patterns becomes 4q; if m is the product of two different integers, two types of synchronous patterns make up one set and thus, the number of synchronous patterns becomes 2q. If m is a square number, p1, p2, ..., pr and q is natural numbers and satisfy $2^{p1}+2^{p2}+\ldots+2^{pr}+4q \leq {}_mC_n$. If m is the product of two different integers, p1, p2, ..., pr and q is natural numbers and satisfy $2^{p1}+2^{p2}+\ldots+2^{pr}+2q \leq {}_mC_n$.

Next, such distribution into the information patterns and the synchronous patterns will be specifically discussed with focusing attention on a specific distribution method in a specific coding system.

Figure 11:
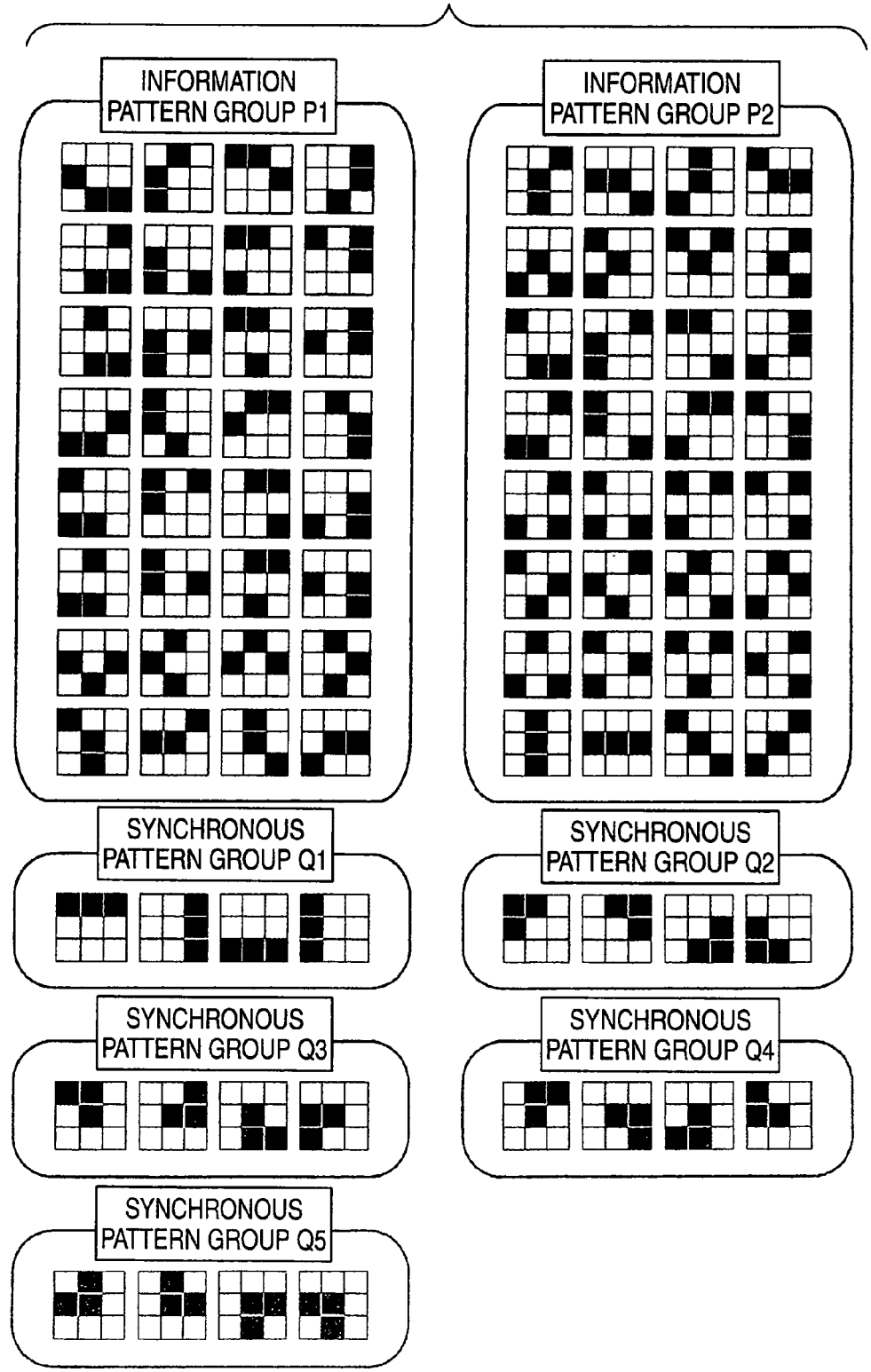
FIG. 11 is a drawing to show a specific example of distribution into the information patterns and the synchronous patterns.

FIG. 11 shows the distribution method in distribution No. 2 in the $_9C_3$ system in FIG. 10. That is, the unit code patterns in the $_9C_3$ system are distributed into two information pattern groups and five synchronous pattern sets. Specifically, four kinds of unit code patterns symmetrical with respect to 90-degree rotation are selected for making up one synchronous pattern set, and the five synchronous pattern sets are provided. The unit code patterns resulting from excluding the 20 unit code patterns used as the synchronous patterns are classified into two groups each consisting of 32 unit code patterns.

In FIG. 11, the two information pattern groups are referred to as information pattern groups P1 and P2 and the five synchronous pattern sets are referred to as synchronous pattern groups Q1, Q2, Q3, Q4, and Q5.

Next, code blocks each made up of the unit code patterns will be described.

Figure 12:
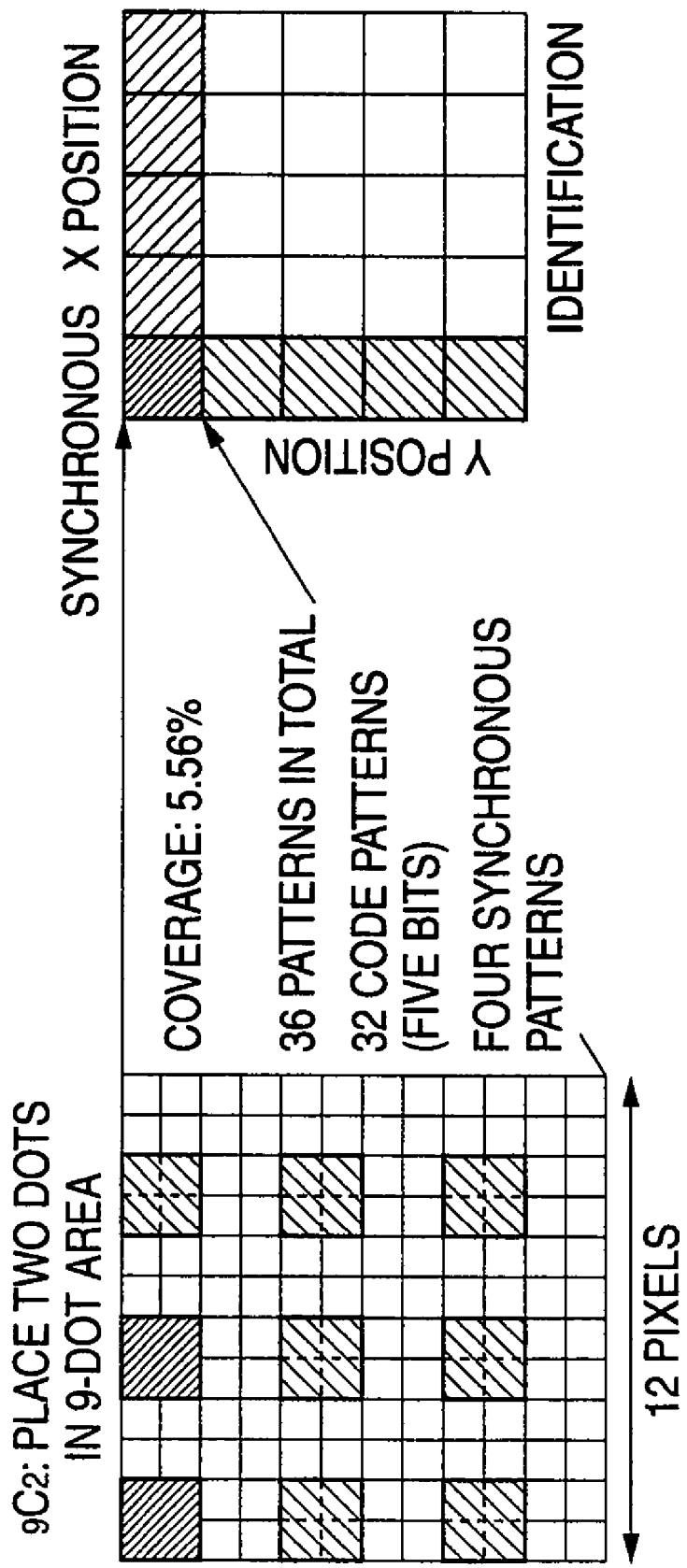
FIG. 12 is a drawing to show an example of a layout of code blocks.

FIG. 12 shows an example of code blocks. FIG. 12 also shows use of the unit code patterns in the $_9C_2$ system. That is, the 36 kinds of unit code patterns are distributed into four patterns used as synchronous patterns and 32 patterns used as information patterns, for example. The patterns are placed in accordance with a layout.

In FIG. 12, such a layout is adopted that 25 areas (blocks), each where three dots by three dots can be placed, are arranged as five blocks by five blocks. A synchronous pattern is placed in the upper left one block of the 25 blocks. Information patterns representing X-direction position information are placed in the four blocks to the right of the synchronous pattern. Information patterns representing Y-direction position information are placed in the four blocks below the synchronous pattern. Further, information patterns representing identification information of a sheet of paper or a document printed on the sheet of paper are placed in the 16 blocks surrounded by the information patterns representing the position information.

In the exemplary embodiment, various layout variations are assumed.

FIG. 13 shows layout examples where the area in which dots can be placed is a square.

Figure 13A:
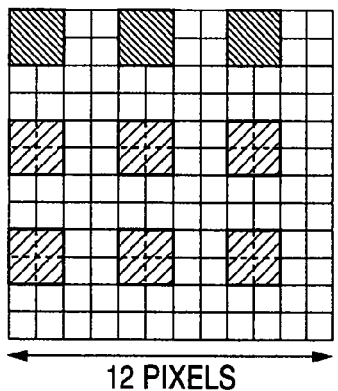
FIG. 13A to 13E are drawings to show other examples of a layout of the code blocks.

First, FIG. 13A shows a unit code pattern in the $_9C_3$ system as a unit code pattern example where the area in which dots can be placed is a square.

FIGS. 13B to 13E show layouts of code blocks.

Figure 13B:
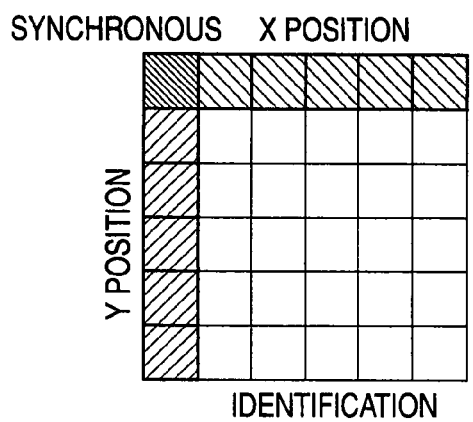
Figure 13C:
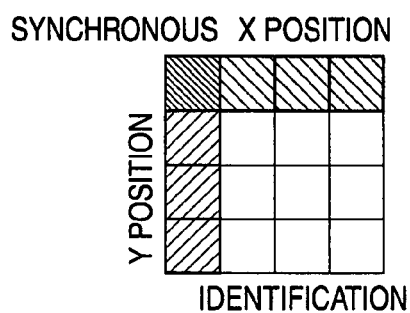

Each of FIGS. 13B and 13C shows a layout of placement of a synchronous pattern and information patterns indicating X position information, Y position information, and identification information like the layout in FIG. 12. In FIG. 13B, 36 blocks (six blocks by six blocks) are arranged, while in FIG. 13C, 16 blocks (four blocks by four blocks) are arranged. The both differ in code block size.

Figure 13D:
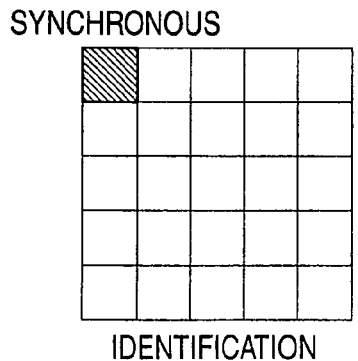
Figure 13E:
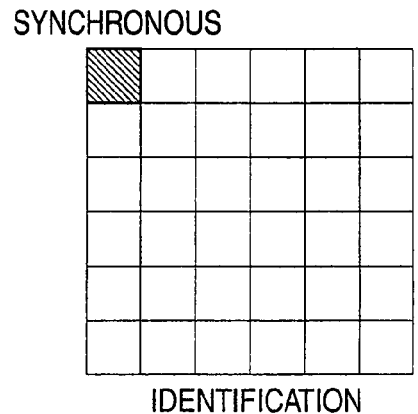
Figure 25:
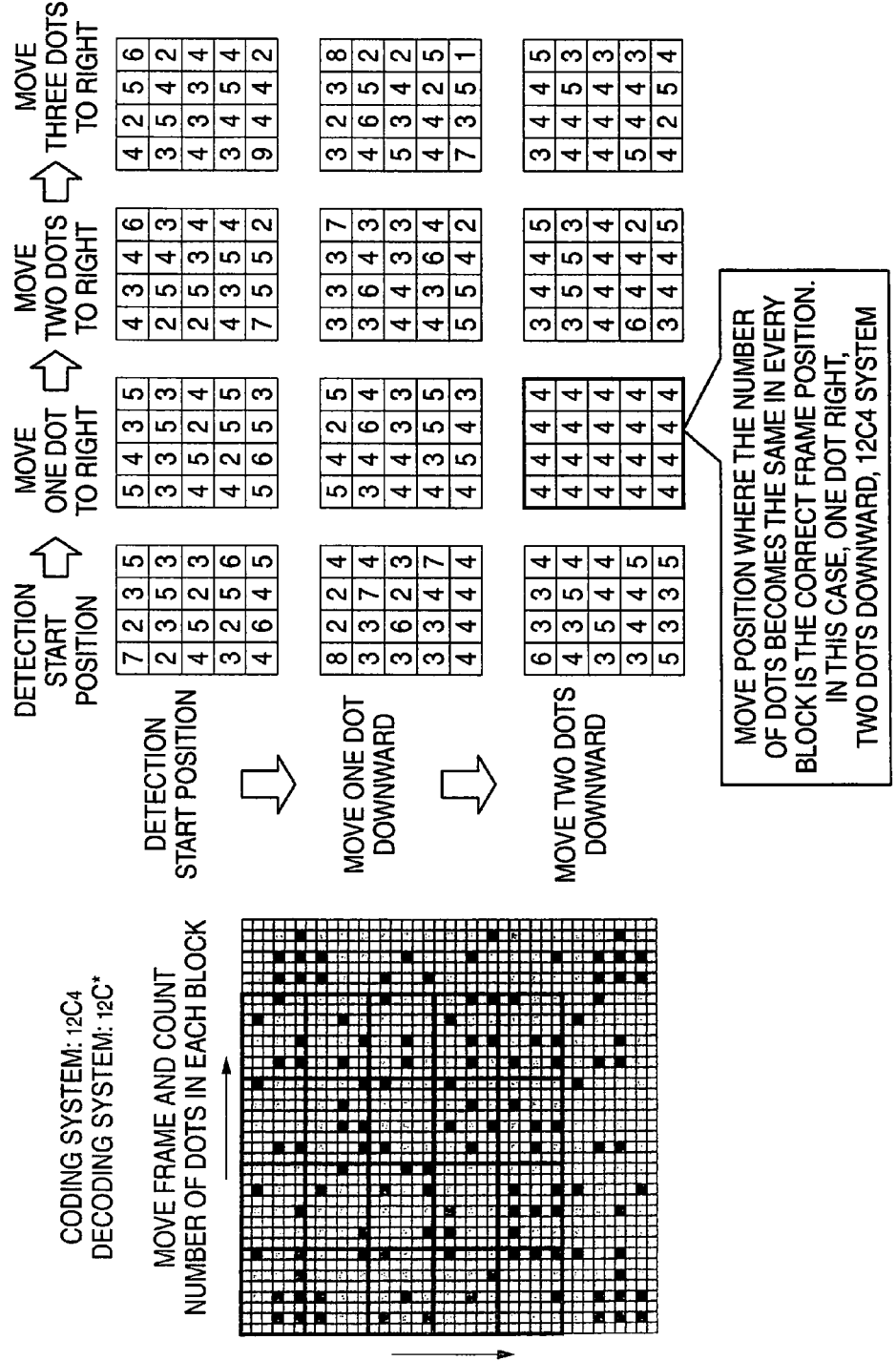
FIG. 25 is a drawing to show a block separator when $_{12}C_4$ codes are decoded with the $_{12}C_n$ system.

Each of FIGS. 13D and 13E shows a layout where information patterns indicating position information are not placed although a synchronous pattern and information patterns indicating identification information are placed. In FIG. 13D, 25 blocks (five blocks by five blocks) are arranged, while in FIG. 13E, 36 blocks (six blocks by six blocks) are arranged. The two layouts different in size are provided.

FIG. 14 shows layout examples where the area in which dots can be placed is a rectangle.

Figure 14A:
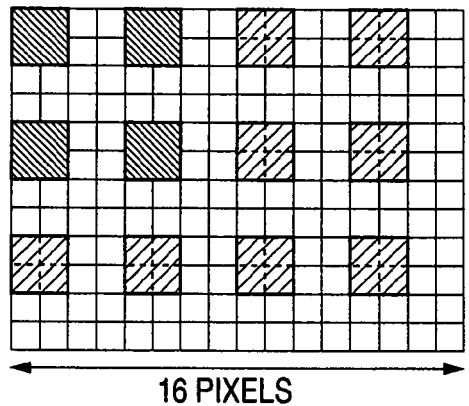
FIG. 14A to 14D are drawings to show other examples of a layout of the code blocks.

First, FIG. 14A shows a unit code pattern in the $_{12}C_4$ system as a unit code pattern example where the area in which dots can be placed is a rectangle.

FIGS. 14B to 14E show layouts of code blocks.

Figure 14B:
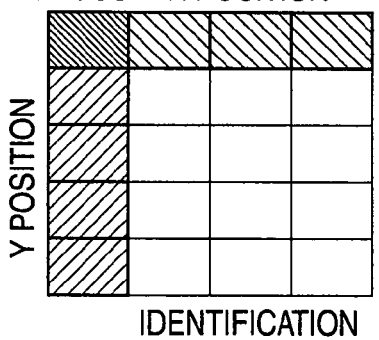

FIG. 14B shows a layout of placement of a synchronous pattern and information patterns indicating X position information, Y position information, and identification information like the layout in FIG. 12. Here, 20 blocks (four blocks by five blocks) are arranged.

Figure 14C:
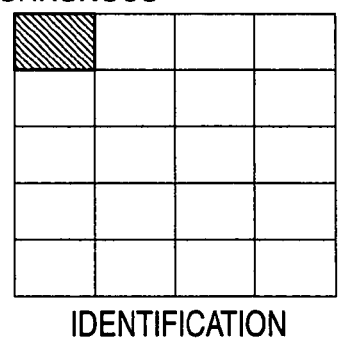
Figure 14D:
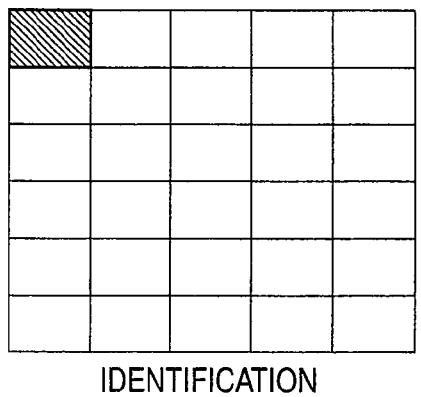
Figure 20:
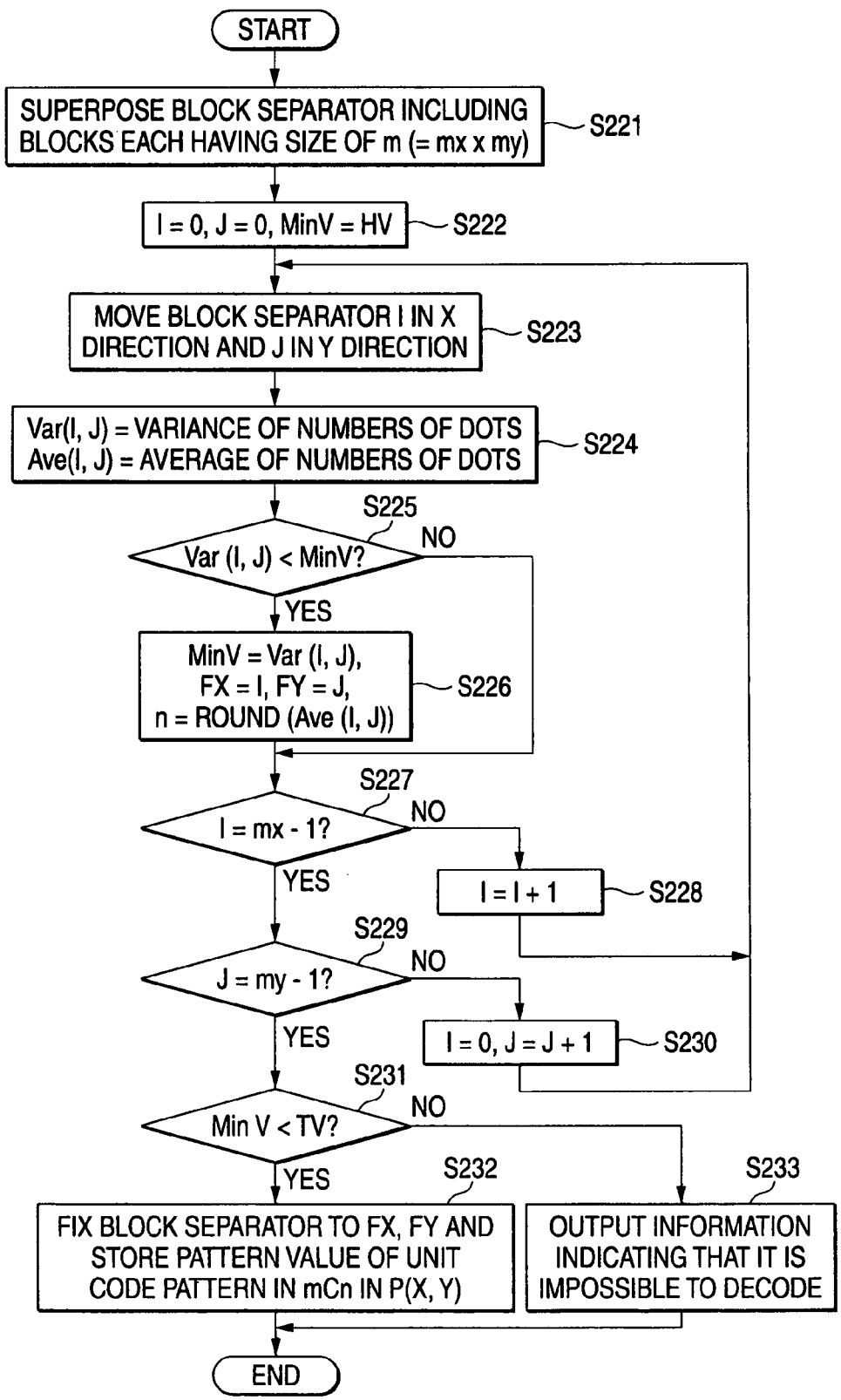
FIG. 20 is a flowchart to show an operation of determining a coding system using a block separator.

Each of FIGS. 14C and 14D shows a layout where information patterns indicating position information are not placed although a synchronous pattern and information patterns indicating identification information are placed. In FIG. 14C, 20 blocks (four blocks by five blocks) are arranged, while in FIG. 14D, 30 blocks (five blocks by six blocks) are arranged. The two layouts different in size are provided.

The layouts shown in FIGS. 13 and 14 are shown by way of example and any other layout may be adopted. For example, such a layout may be used where only information patterns indicating position information are placed and no information patterns indicating identification information are placed.

In the exemplary embodiment, the code blocks having such a layout are used as basic units and are placed on the entire sheet of paper periodically. The position information may be represented in M sequences (maximum length sequences) over the length and the width of the sheet of paper as described later. The identification information may be coded with any of several methods. In the exemplary embodiment, RS coding is adopted because RS coding is a multilevel coding method. In this case, block representation can be made to correspond to multilevel values of RS code. Of course, any other coding method may also be used.

Next, an image generation apparatus 10 for generating such an image will be described.

Figure 15:
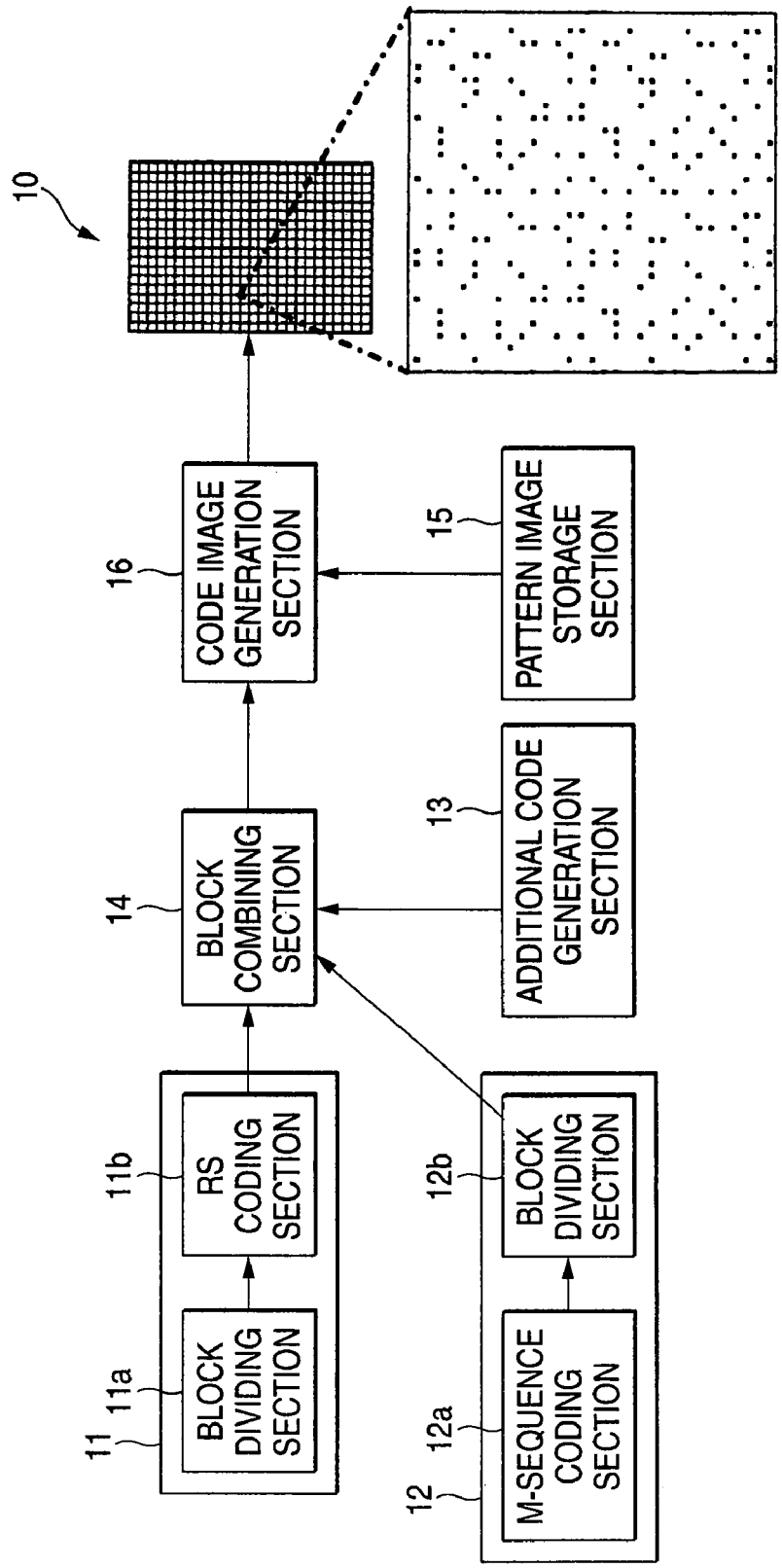
FIG. 15 is a functional block diagram of an image generation apparatus according to an exemplary embodiment of the invention.

FIG. 15 is a block diagram to show a configuration example of the image generation apparatus 10.

As shown in FIG. 15, the image generation apparatus 10 includes an identification code generation section 11, a position code generation section 12, an additional code generation section 13, a block combining section 14, a pattern image storage section 15, and a code image generation section 16.

The identification code generation section 11 generates an identification code by coding identification information of a sheet of paper or a document printed on the sheet of paper. The identification code generation section 11 includes a block dividing section 11a and an RS coding section 11b.

The block dividing section 11a divides a bit string forming the identification information into plural blocks in order to perform RS coding. For example, to use information patterns capable of representing five-bit information in the $_9C_2$ system, 60-bit identification information is divided into 12 blocks each having five bits in a block length.

The RS coding section 11b performs RS coding for the divided blocks and adds a redundant block for error correction. For example, if it is assumed that RS code capable of correcting an error of two blocks is adopted in this example, the code length becomes 16 blocks.

The exemplary embodiment assumes that the identification code generation section 11 codes the identification information with the $_mC_n$ system corresponding to predetermined m and n.

The position code generation section 12 generates a position code by coding position information indicating each coordinate position on a sheet of paper. The position code generation section 12 includes an M-sequence coding section 12a and a block dividing section 12b.

The M-sequence coding section 12a codes the position information using M sequences. For example, an order of the M sequences is obtained from a length of the position information to be coded, and the M sequences are dynamically generated. Thereby, the position code is generated. However, if the length of the position information to be coded is previously known, the M sequences maybe stored in memory, etc., of the image generation apparatus 10 and when an image is generated, the M sequences may be read.

The block dividing section 12b divides the M sequences into plural blocks. For example, if it is assumed that 16 kinds of unit code patterns are selected as information patterns, four-bit information is stored in each block in code block. Therefore, 16-bit X direction position information is stored for the code block having a layout as shown in FIG. 12. If it is assumed that 12-order M sequences is used, the sequence length of the M sequences becomes 4094 ($=2^{12}-1$). If the sequences are cut out every four bits and are represented as code patterns, three bits remain at last. The first one bit of the M sequences is added to the three bits to form 4 bits represented as a code pattern. Further, the sequences are cut out every four bits starting at the second bit of the M sequences and are represented as code patterns. As the operation is repeated, the next cycle starts at the third bit of the M sequences and the next cycle starts at the fourth bit. Further, the fifth cycle starts at the fifth bit and matches the first cycle. Therefore, if the four cycles of the M sequences are cut out every four bits, 4095 code patterns can be covered. Since the M sequences are 12 orders, three consecutive code patterns do not match consecutive code patterns at any other position. Then, if three code patterns are read at the reading time, decoding is possible, but information is represented in four blocks considering an error.

The four-cycle M sequences are divided into 4095 code blocks for storage. Since the length of one side of one code block is 2.538 mm ($=0.5076\times5$), the length of consecutive 4095 code blocks is 10393.1 mm. This means that the length of 10393.1 mm is coded.

The exemplary embodiment assumes that the position code generation section 12 codes position information using the $_mC_n$ system corresponding to predetermined m and n.

In the exemplary embodiment, the identification code generation section 11, the position code generation section 12 and the additional code generation section 13 are provided as an example of an acquisition unit that acquires information to be embedded in each of plural partitions on a recording medium. The term "partition" may mean a code block, for example.

The additional code generation section 13 encodes additional information to be embedded in the recording medium in addition to the identification information and the position information, to generate an additional code. Here, the additional information is not limited. For example, information for restricting reading of the identification information and/or the position information from the recording medium, information representing the copyright holder of the image formed on the recording medium, or the like may be used as additional information.

The block combining section 14 places the identification code generated by the identification code generation section 11, the position code generated by the position code generation section 12, and a synchronous code that controls reading of the identification code and the position code two-dimensionally, so as to generate a two-dimensional code array. The term "synchronous code" may mean a code corresponding to the synchronous pattern.

The pattern image storage section 15 stores unit code patterns in the $_mC_n$ system shown in FIGS. 1 to 8, for example. A pattern value for uniquely identifying each unit code pattern is added to the unit code pattern. For example, pattern values of 0 to 35 are added to the unit code patterns in the $_9C_2$ system. They correspond to the code values in the two-dimensional code array generated by the block combining section 14. That is, each unit code pattern is uniquely identified from the code value and is selected. In the exemplary embodiment, the pattern image storage section 15 may store at least the unit code patterns in the $_mC_n$ system corresponding to predetermined m and n.

The code image generation section 16 refers to the two-dimensional code array generated by the block combining section 14, selects the unit code pattern corresponding to each code value, and generates a code image. In the exemplary embodiment, the code image generation section 16 is provided as an example of a generation unit that generates an image in which a pattern image representing information and a pattern image controlling reading of that pattern image are arranged in each of plural partitions.

The code image is passed to an image formation section (not shown), which then forms the code image on a sheet of paper. At this time, the image formation section may form a superposition image with the document image of an electronic document and the code image superposed on each other on the sheet of paper. To thus form a superposition image, if there is a concern that a shift may occur between each position on the electronic document and each position on the sheet of paper, the correspondence between the positions on the electronic document and the positions on the sheet of paper may be managed so that written data with an electronic pen on the sheet of paper is reflected on the appropriate positions on the electronic document.

The image formation section forms the code image in K toner (infrared absorption toner containing carbon) or special toner using electrophotography, for example.

For example, invisible toner having the maximum absorption rate being 7% or less in a visible light region (400 nm to 700 nm) and the absorption rate being 30% or more in a near-infrared region (800 nm to 1000 nm) is shown as the special toner. The terms "visible" and "invisible" do not relate to whether or not visual recognition can be made. The terms "visible" and "invisible" are distinguished from each other depending on whether or not an image formed on a printed medium cab be recognized according to the presence or absence of color reproduction caused by absorption of a specific wavelength in the visible light region. If it is hard to recognize by the eye of a human being although there is some reproduction caused by absorption of a specific wavelength in the visible light region, the term "invisible" is also applied.

The functions are implemented as the software and hardware resources cooperate. Specifically, a CPU 91 (see FIG. 32) of the image generation apparatus 10 reads a program for implementing the block dividing section 11a, the RS coding section 11b, the M-sequence coding section 12a, the block dividing section 12b, the block combining section 14, and the code image generation section 16, for example, into main memory 92 (see FIG. 32) from a magnetic disk unit 93 (see FIG. 32) for execution. The pattern image storage section 15 may be implemented using the magnetic disk unit 93 (see FIG. 32), for example. Further, the program and data stored in the magnetic disk unit 93 (see FIG. 32) may be loaded from a recording medium such as a CD or may be downloaded through communication means of the Internet, etc.

Next, the operation of the exemplary embodiment to generate an image will be described below.

In the exemplary embodiment, before an image is generated, parameters for controlling the operation are given. First, the parameters will be described. The parameters may be externally input by a user or may be calculated by the image generation apparatus 10 based on an amount of information to be represented, a size of a sheet of paper in which information is to be embedded, etc., for example.

For example, the following first to third parameters may be employed.

The first parameter is a size of a code block. The exemplary embodiment allows a code block to have various sizes as shown in FIGS. 12 to 14D. The size is specified by the first parameter. For example, the first parameter includes the number of blocks in the X direction of the code block and the number of blocks in the Y direction. In the following description, the former is expressed as Bx and the latter as By.

The second parameter is a kind of pattern placed in each block in the code block. That is, the second parameter specifies an information pattern representing what information is to be placed at which position using a synchronous pattern as a reference. For example, the second parameter includes information that identifies a block and information that specifies a kind of a pattern placed in the block. Specifically, letting the block where a synchronous pattern is placed be X=0, Y=0, a kind of a pattern placed in X=E, Y=F block is stored in C (E, F) (where E=0, 1, 2, . . . , Bx, F=0, 1, 2, . . . , By). To generate the code block having the layout shown in FIG. 13B, C (0, 0)="synchronous," C (E, 0)="X position" (E=1, 2, . . . , 5), C (0, F)="Y position" (F=1, 2, . . . , 5), and C (E, F)="identification" (E=1, 2, . . . , 5, F=1, 2, . . . , 5). It is noted that for a kind of a pattern stored in C (E, F), a "synchronous pattern" may be expressed as "synchronous," an "information pattern representing X position information" may be expressed as "X position," an "information pattern representing Y position information" may be expressed as "Y position," and an "information pattern representing identification information" may be expressed as "identification."

The third parameter is a method of dividing information patterns. If the number of synchronous patterns is the same in the same $_mC_n$ system, there may be plural methods of dividing information patterns, that is, there may be plural methods of grouping information patterns as shown in FIG. 10. For example, the case where five sets of synchronous patterns are provided in the $_9C_3$ system is considered. In this case, to group information patterns, available is either a first method of grouping 64 kinds of information patterns as a single group (distribution No. 1) or a second method of classifying 64 kinds of information patterns into two groups each made up of 32 kinds of information patterns (distribution No. 2). Although not shown in FIG. 10, alternatively available is either a third method of classifying 64 kinds of information patterns into four groups each made up of 16 kinds of information patterns or a fourth method of classifying 64 kinds of information patterns into eight groups each made up of eight kinds of information patterns. Then, the exemplary embodiment makes it possible to know which method of dividing information patterns is adopted by information as to which set the used synchronous pattern belongs to among the plural sets of synchronous patterns. The third parameter may specify a distribution No. in an $_mC_n$ system used in generating an image. In this case, the image generation apparatus 10 finds the number of divisions D based on the specified distribution No.

These parameters are shown by way of example. Any parameters may be used as the first and second parameters so long as the parameters specify a layout of a code block. Also, any parameter may be used as the third parameter so long as the parameter relates to a method of selecting information patterns from among plural information pattern groups. Any parameter relating to placement of information patterns may be adopted in addition to specifying of a layout of a code block and selecting of information patterns from among plural information pattern groups.

The parameters are stored in a parameter storage section (not shown) such as a memory and the sections of the image generation apparatus 10 operate based on the parameters stored in the parameter storage section.

First, the identification code generation section 11 finds the number of blocks to store an identification code based on a size of a code block specified by the first parameter and a kind of a pattern placed in each block specified by the second parameter. The block dividing section 11a and the RS coding section 11b perform the block dividing process and the RS coding so that the number of blocks becomes the found number of blocks finally. For example, if the parameters indicate the layout shown in FIG. 13B, 25 blocks are provided per code block.

The position code generation section 12 finds the number of blocks to store a position code based on the code block size of the first parameter and the type of pattern placed in each block of the second parameter. The M-sequence coding section 12a and the block dividing section 12b perform the M sequences coding and the block dividing process so that the number of blocks becomes the found number of blocks finally. For example, if the parameters indicate the layout shown in FIG. 13B, five blocks are provided as the X position information in one code block.

Further, the additional code generation section 13 divides an additional code into plural blocks based on the size of the code block specified by the first parameter. Such divided additional codes are represented as A (E, F). It is noted that letting the block in which a synchronous pattern is embedded being E=0, F=0, no additional code is embedded in the synchronous pattern. Thus, A(E, F) ((E, F)=(1, 0), (2, 0), ..., (Bx, 0), (0, 1), (1, 1), (2, 1), ..., (Bx, 1), ..., (0, By), (1, By), (2, By), ..., (Bx, By)). This means that of Bx×By blocks, the additional code is divided into Bx×By−1 blocks except the block in which the synchronous pattern is embedded.

At this time, the number of divisions D is found from the method of dividing information patterns specified by the third parameter and the number of pieces of information assigned to each block is determined based on the number of divisions D. The number of pieces of information that can be represented by one block becomes equal to the number of divisions D. That is, when D=2, two pieces of information is represented by each block. For example, if information patterns are classified into information pattern groups P1 and P2 as shown in FIG. 11, "0" is made to correspond to the information pattern group P1 and "1" is made to correspond to the information pattern group P2. When D=3, "0," "1," and "2" are made to correspond to the information pattern groups, so that three pieces of information are represented by each block. Further, when D=4, "0," "1," "2," and "3" are made to correspond to the respective information pattern groups, so that four pieces of information are represented by each block. When D=1, no additional code can be embedded. However, here, A (E, F)=0 for convenience.

In addition, in the exemplary embodiment, correspondence information that associates each set of synchronous patterns with a corresponding rule that relates to placement of information patterns and is employed when synchronous patterns belonging to each set are used is stored in a correspondence information storage section (not shown) such as a memory. The rule relating to placement of information patterns may be represented using the first to third parameters in combination, for example. The case where the sets of synchronous patterns and the combinations of the first and second parameters are stored in association with each other is considered by way of example. For example, it is assumed that five sets of synchronous patterns are provided in the $_9C_3$ system as shown in FIG. 11, the synchronous pattern group Q1 may be associated with the layout shown in FIG. 13B, the synchronous pattern group Q2 may be associated with the layout shown in FIG. 13C, the synchronous pattern group Q3 may be associated with the layout shown in FIG. 13D, and the synchronous pattern group Q4 may be associated with the layout shown in FIG. 13E. If they are thus associated, one of the five sets of synchronous patterns is not associated with any layout. This one may be associated with another layout (not shown) or may be associated with no layout.

In contrast, if a large number of the combinations of the first to third parameters are considered, sets of synchronous patterns to be associated with the combinations may be short. In this case, particularly necessary combinations may be selected as many as the number of sets of synchronous patterns from among many combinations and may be associated with the sets of synchronous patterns.

The operation of the block combining section 14 will be described in detail based on the description given above.

Figure 16:
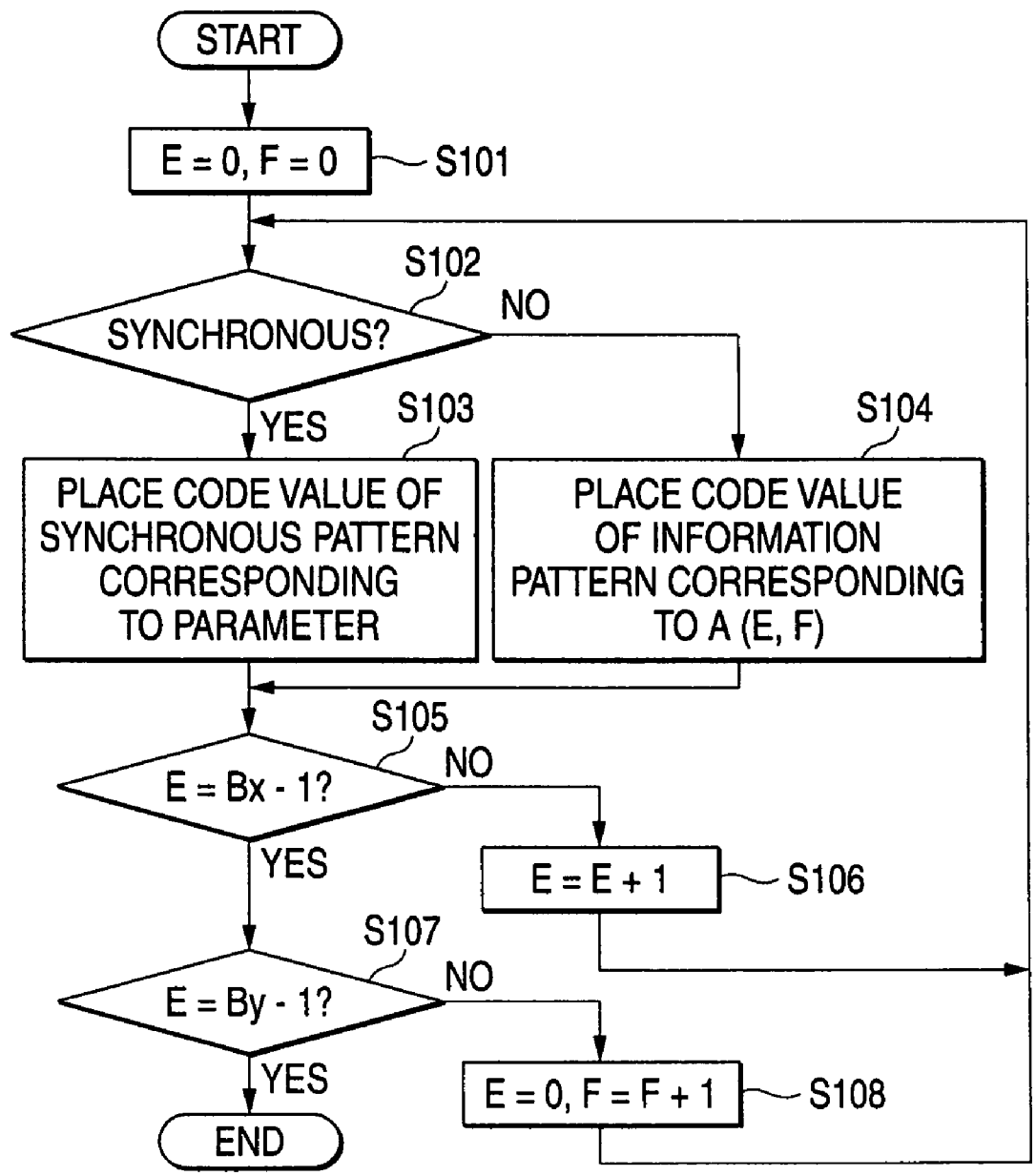
FIG. 16 is a flowchart to show the operation of a block combining section according to the exemplary embodiment of the invention.

FIG. 16 is a flowchart to show the operation of the block combining section 14. The operation of the block combining section 14 is applied to one code block. Actually, the block combining section 14 performs a similar process for the code blocks placed on the entire sheet of paper.

First, the block combining section 14 assigns "0" to E and F (step 101). E is a counter that counts the number of blocks in the X direction, and F is a counter that counts the number of blocks in the Y direction.

Next, the block combining section 14 refers to the parameters stored in the parameter storage section and determines as to whether or not C (E, F) is "synchronous" (step 102).

If the block combining section 14 determines that C (E, F) is "synchronous," the block combining section 14 determines a set of synchronous patterns corresponding to the parameters by referring to the correspondence information storage section. Then, the block combining section 14 places a synchronous code corresponding to the synchronous patterns belong to the determined set, on a two-dimensional code array (step 103).

On the other hand, if the block combining section 14 determines that C (E, F) is not "synchronous," namely, if the block combining section 14 determines that C (E, F) is any of "X position," "Y position," and "identification," the block combining section 14 determines an information pattern group corresponding to a value stored in A (E, F) given by the additional code generation section 13. The block combining section 14 selects an information pattern representing the information to be placed from among the information pattern groups and places a code corresponding to the selected information pattern on the two-dimensional code array (step 104).

Next, the block combining section 14 determines as to whether or not E=Bx−1 (step 105).

If the block combining section 14 does not determine that E=Bx−1, the block combining section 14 adds one to E (step 106) and repeats steps 102 to 104 until E=Bx−1. When E=Bx−1, then the block combining section 14 determines as to whether or not F=By−1 (step 107). If the block combining section 14 does not determine that F=By−1, the block combining section 14 assigns "0" to E and adds one to F (step 108) and repeats steps 102 to 106 until F=By−1. When F=By−1, the block combining section 14 completes placing of codes in the code block.

Next, an image processing apparatus 20 for reading and processing a code image formed on a sheet of paper will be described. In the exemplary embodiment, it is assumed that values of m and n in an $_mC_n$ system that are used when the code image is generated are unknown.

Figure 17:
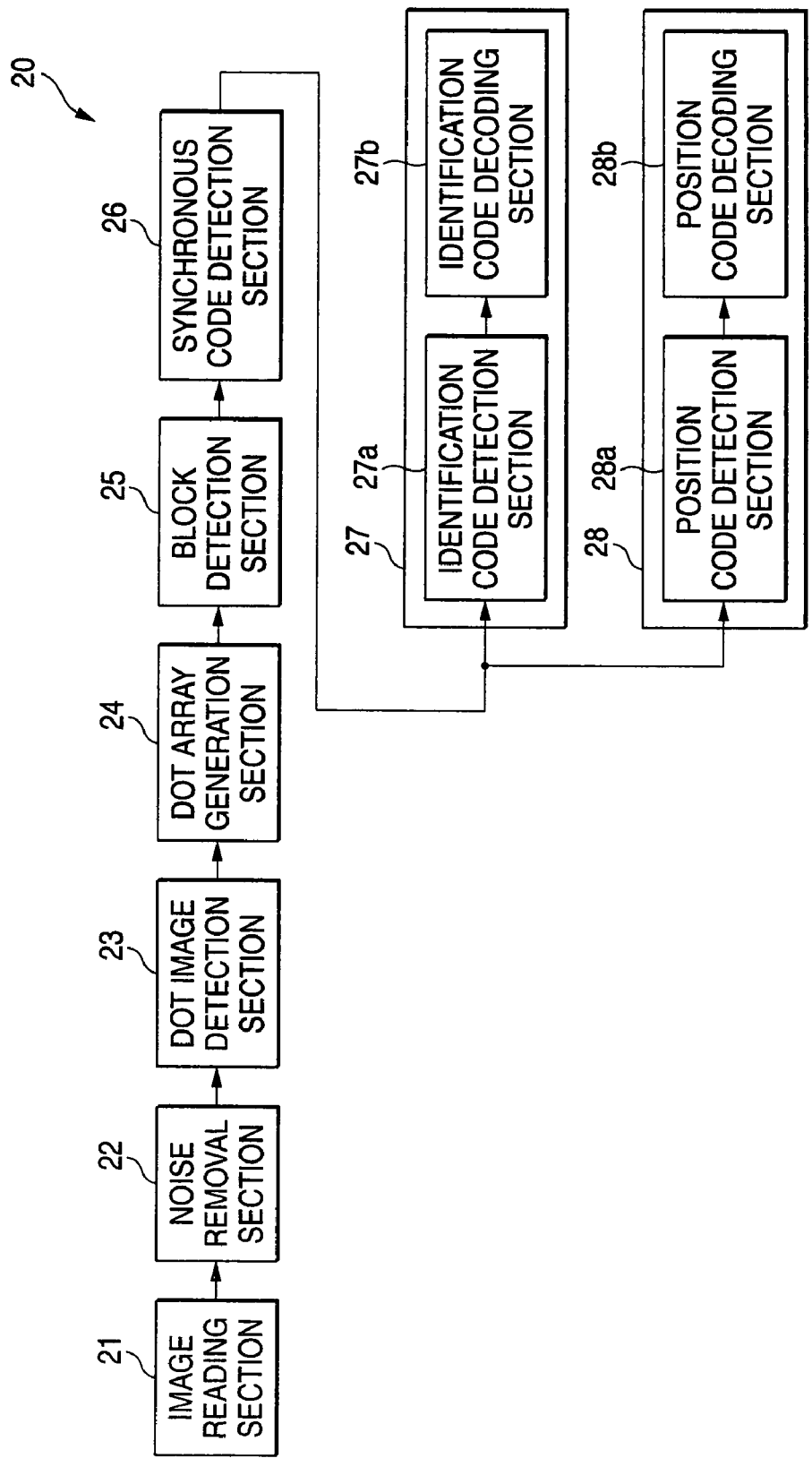
FIG. 17 is a functional block diagram of an image processing apparatus according to the exemplary embodiment of the invention.

FIG. 17 is a block diagram to show the configuration example of the image processing apparatus 20.

As shown in FIG. 17, the image processing apparatus 20 includes an image reading section 21, a noise removal section 22, a dot image detection section 23, a dot array generation section 24, a block detection section 25, a synchronous code detection section 26, an identification information acquisition section 27, and a position information acquisition section 28.

The image reading section 21 reads a code image printed on a sheet of paper with an imaging device such as a CCD (Charge Coupled Device) or a CMOS (Complementary Metal Oxide Semiconductor). In the exemplary embodiment, the image reading section 21 is provided as an example of an image acquisition unit that acquires an image containing a pattern image representing information and a pattern image that controls reading of that pattern image from a recording medium.

The noise removal section 22 removes noise contained in the read image. The noise includes noise occurring due to variations in sensitivity of the imaging device or an electronic circuit, for example. Although the type of noise removal processing should be matched with the characteristic of the imaging system, a blurring process and/or a sharpening process such as unsharp masking may be applied.

The dot image detection section 23 detects each dot with noise removed. That is, the dot image detection section 23 determines positions where dots are formed. To detect dots, first the dot image detection section 23 separates a dot image portion and other background image portions by performing a binarization process, and detects the positions of the dots from respective positions of binarized images. At this time, the binarized images may contain a large number of noise components. Therefore, the dot image detection section 23 may perform a filtering process to determine dots, based on an area and a shape of the binarized images.

The dot array generation section 24 refers to the positions of the detected dots and generates a dot array. That is, on a two-dimensional array, for example, "1" is stored at a position where a dot exists and "0" is stored at a position where no dot exists. Thereby, the dots detected as images are replaced with digital data. The two-dimensional array is output as a dot array.

In the exemplary embodiment, the dot array generation section 24 determines m and n in an $_mC_n$ system that are used in coding, based on a ratio between all the elements of the dot array and the elements where "1" is recorded, for example.

The block detection section 25 detects a block corresponding to a unit code pattern in a code block on the dot array. That is, the block detection section 25 moves a rectangular block separator having the same size as the unit code pattern appropriately on the dot array, adopts a position where the numbers of dots in the blocks becomes uniform as a correct block separation position, and generates a code array storing the pattern values in each block.

In the exemplary embodiment, the block detection section 25 determines m and n in the $_mC_n$ system that are used in coding, based on a size of each block and the number of dots in each block when the numbers of dots in the blocks becomes uniform.

The synchronous code detection section 26 refers to a kind of unit code pattern detected from the dot array and detects a synchronous code. If the unit code pattern is a square, there is a possibility that the unit code pattern may be rotated in 90-degree units. Then, the synchronous code detection section 26 detects and corrects the orientation based on which of the four kinds of synchronous patterns the detected synchronous code corresponds to. If the unit code pattern is a rectangle, there is a possibility that the unit code pattern maybe rotated in 180-degree units. Then, the synchronous code detection section 26 detects and corrects the orientation based on which of the two kinds of synchronous patterns the detected synchronous code corresponds to.

The identification information acquisition section 27 acquires identification information from the code array based on the synchronous code detected by the synchronous code detection section 26. The identification information acquisition section 27 includes an identification code detection section 27a and an identification code decoding section 27b.

The identification code detection section 27a detects an identification code from the code array whose orientation is corrected, with using the position of the synchronous code as a reference.

The identification code decoding section 27b decodes the identification code using the same parameters as the parameters (the number of blocks, etc.,) used in the coding processing of RS code previously described with reference to FIG. 15, and outputs identification information.

The position information acquisition section 28 acquires position information from the code array based on the synchronous code detected by the synchronous code detection section 26. The position information acquisition section 28 includes a position code detection section 28a and a position code decoding section 28b.

The position code detection section 28a detects a position code from the code array whose orientation is corrected, with using the position of the synchronous code as a reference.

The position code decoding section 28b extracts partial sequences of M sequences from the position code detected by the position code detection section 28a, refers to the position of the partial sequences in the M sequences used in generating the image, and outputs a correction value of the position of the partial sequences, which is corrected with an offset based on the synchronous code, as position information. The reason why the offset correction is made at the time is that a synchronous code is placed between position codes.

In the exemplary embodiment, the synchronous code detection section 26, the identification information acquisition section 27, and the position information acquisition section 28 are provided as an example of an information acquisition unit that determines a pattern image group to which a pattern image that controls reading of a pattern image representing information belongs, and that acquires information based on a rule associated with the pattern image group.

The functions are implemented as the software and hardware resources cooperate. Specifically, a CPU 91 (see FIG. 32) of the image processing apparatus 20 reads a program for implementing the noise removal section 22, the dot image detection section 23, the dot array generation section 24, the block detection section 25, the synchronous code detection section 26, the identification code detection section 27a, the identification code decoding section 27b, the position code detection section 28a, and the position code decoding section 28b, for example, into main memory 92 (see FIG. 32) from a magnetic disk unit 93 (see FIG. 32) for execution. The program and data stored in the magnetic disk unit 93 (see FIG. 32) may be loaded from a recording medium such as a CD or may be downloaded through communication means of the Internet, etc.

Next, the operation of the exemplary embodiment in image processing will be described below.

In the exemplary embodiment, even if values of m and n in the $_mC_n$ system that are used in coding are unknown, the coded image is read and then the values of m and n are determined. To determine the values of m and n, in a first type, when the value of n is unknown although the value of m is known, the value of n is determined. In a second type, when the value of m is unknown although the value of n is known, the value of m is determined. In a third type, when both the values of m and n are unknown, both the values of m and n are determined.

The operation of determining the coding system will be described below on the assumption that both the values of m and n are unknown so as to be able to deal with all types.

To determine the coding system, there are a determination method based on the dot density and a determination method using a block separator.

To begin with, the determination method based on the dot density will be described.

Determination based on the dot density is made as a process after the dot array generation section 24 shown in FIG. 17 generates a dot array. That is, the dot array generation section 24 generates a dot array in which "1" is stored at the position where a dot exists and "0" is stored at the position where no dot exists, for example, as a precondition of this process.

To perform this process, it is assumed that a dot density table as shown in FIG. 18 is stored in a memory that may be referred to by the dot array generation section 24.

The dot density table stores a dot density when a code image is generated in each $_mC_n$ system in a cell corresponding to the value of m and the value of n. For example, the table indicates that the dot density when the $_9C_2$ system is used is "0.222" and that the dot density when the $_9C_3$ system is used is "0.333." In the following description, in the dot density table, m stored in the $G_{th}$ row from the top will be expressed as m (G). This is because m is not necessarily equal to G in the $G_{th}$ row as m needs to be at least the product of two integers. On the other hand, every integer satisfying 1≦n<m may be used as n. Thus, n=H in the $H_{th}$ column from the left. The dot density stored in the $G_{th}$ row, $H_{th}$ column cell is expressed as DTBL (G, H) and the maximum value of m in this dot density table is expressed as $m_{max}$. In the exemplary embodiment, the dot density table shown in FIG. 18 is adopted as an example of density information that associates a unit image density when each unit image is formed by selecting n positions from among m positions, with the values of m and n.

The dot array generation section 24 compares the dot density in the input image with each dot density in the dot density table in FIG. 18, and estimates the values of m and n.

The operation of the dot array generation section 24 will be specifically described below.

Figure 19:
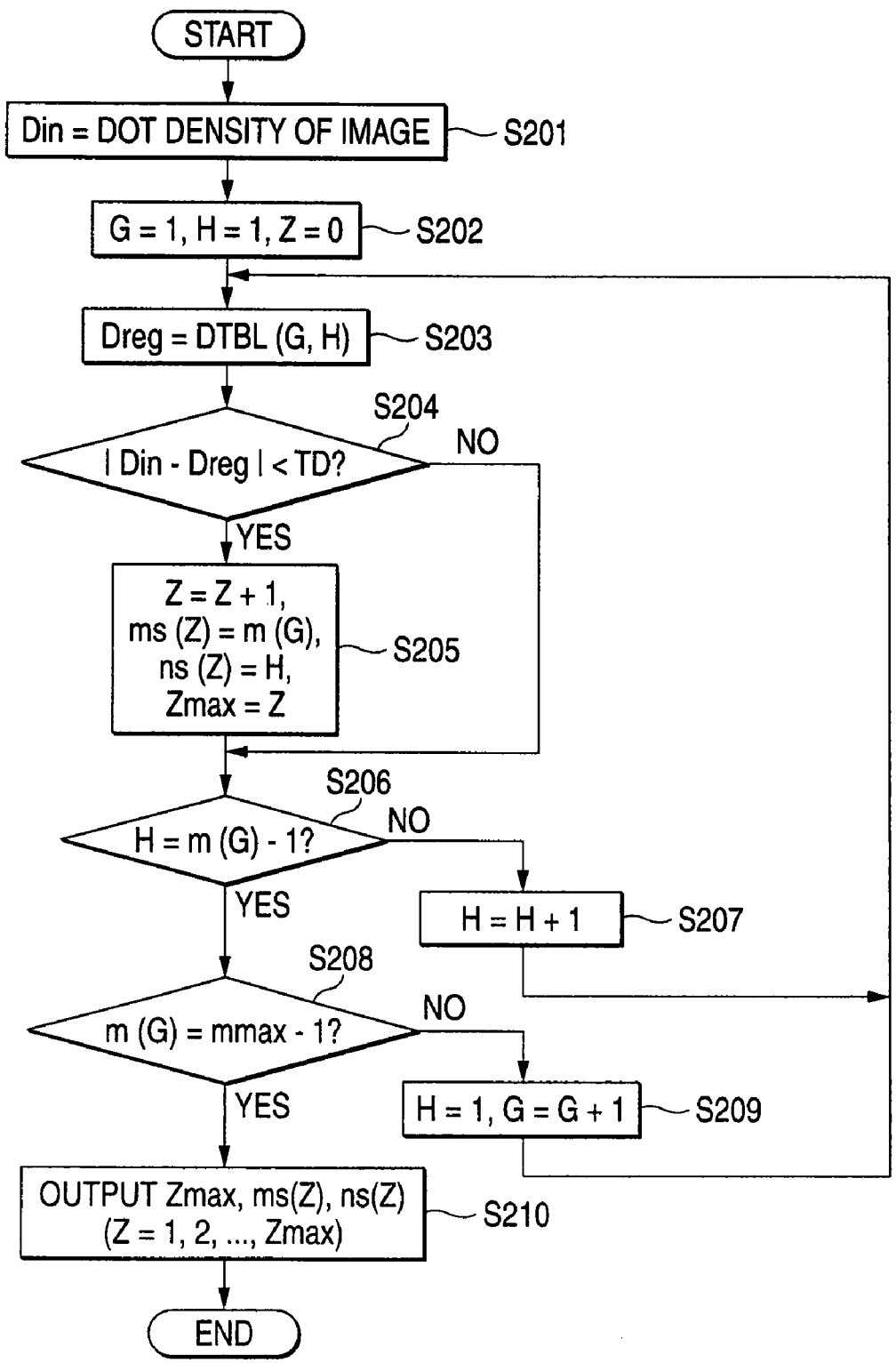
FIG. 19 is a flowchart to show an operation of determining a coding system based on a dot density.

FIG. 19 is a flowchart to show the operation of the dot array generation section 24 when determining a coding system. The dot array generation section 24 detects an inclination angle of an input image based on an inclination between the two nearest dots and superposes lattices which have the inclination and which have the lattice spacing equaling the spacing between the nearest dots, to thereby generate a dot array. However, this process is excluded from the flowchart.

The dot array generation section 24 first counts the number of all elements AD in the dot array and the number of elements ND where "1," for example, indicating that a dot exists is stored in the dot array. The dot array generation section 24 calculates ND/AD to calculate a ratio of the dots in the entire image. The dot array generation section 24 assigns this ratio to Din as a dot density of the input image (step 201).

The dot array generation section 24 assigns "1" to counters G and H to identify each cell of the dot density table and assigns "0" to a counter Z that counts the number of the candidates for combinations of m and n in the $_mC_n$ system (step 202).

Next, the dot array generation section 24 refers to the $G_{th}$ row, Hth column cell of the dot density table and assigns the dot density DTBL (G, H) in the cell to Dreg (step 203). Then, the dot array generation section 24 determines as to whether or not a difference between Din found at step 201 and Dreg found at step 204 is smaller than a predetermined threshold value TD (step 204).

If the difference between Din and Dreg is smaller than the threshold value TD, the dot array generation section 24 recognizes that the combination of m(G) and H at this time is a candidate for the combination of m and n to be found. Then, the dot array generation section 24 first adds "1" to Z. The dot array generation section 24 assigns m(G) to a variable ms (Z) to store the candidate for m, and assigns H to a variable ns (Z) to store the candidate for n. Further, the dot array generation section 24 assigns Z to a variable Zmax to store the number of the candidates for the combinations of m and n (step 205). The process goes to step 206.

On the other hand, if the difference between Din and Dreg is not smaller than the threshold value TD, no process is performed and the process goes to step 206.

Then, the dot array generation section 24 determines as to whether or not H=m(G)−1 (step 206). Since the $_mC_n$ system involves the condition of n<m, if scanning is executed over the $G_{th}$ row, that is, m(G), the dot density value is stored only in the cell satisfying H<m(G).

If the dot array generation section 24 does not determine that H=m(G)−1, the dot array generation section 24 adds "1" to H (step 207) and repeats steps 203 to 205 until H=m(G)−1. When H=m(G)−1, then the dot array generation section 24 determines as to whether or not m(G)=$m_{max}$−1 (step 208). If the dot array generation section 24 does not determine that m(G)=$m_{max}$−1, the dot array generation section 24 assigns "1" to H and adds "1" to G (step 209) and repeats steps 203 to 207 until m(G)=$m_{max}$−1. When m(G)=$m_{max}$−1, all cells of the dot density table have been referred to. Thus, the record result is output. That is, the number $Z_{max}$ of the candidates for the combinations of m and n and the values of m and the values of m (ms(Z) and ns(Z) (Z=1, 2, . . . , $Z_{max}$)) as many as $Z_{max}$ are output (step 210).

Next, the determination method using a block separator will be described.

Determination using a block separator is made together with block detection by the block detection section 25 shown in FIG. 17.

The operation of the block detection section 25 at this time will be specifically described below.

FIG. 20 is a flowchart to show the operation of the block detection section 25 when determining a coding system. It is assumed that m dots in a unit code pattern are placed as mx dots in width by my dots in height.

The block detection section 25 first superposes a block separator including blocks each having a size of mx×my on the dot array generated by the dot array generation section 24 (step 221). The block detection section 25 assigns "0" to counters I and J and assigns HV to a variable MinV (step 222).

The counters I and J count a move distance from the initial position of the block separator. The block separator is moved every line of an image and the counters I and J count the number of moved lines. The position where the block separator is superposed on data may be an arbitrary position. This is because even if a reading position shifts, identification information is copied repeatedly and thus is acquired by interpolation. The block separator always contains blocks representing X position information and Y position information.

MinV stores a minimum value of block-to-block variance of the number of dots detected in the respective blocks. HV means a sufficiently large value with respect to the variance.

Next, the block detection section 25 moves the block separator I in the X direction and J in the Y direction (step 223). In the initial state, I and J are equal to "0." Therefore, the block separator does not move. The block detection section 25 counts the number of dots contained in each block of the block separator, assigns variance of the numbers of dots among all blocks to Var(I, J), and assigns the average of the numbers of dots in all blocks to Ave(I, J) (step 224).

The block detection section 25 compares Var(I, J) with MinV (step 225). Since the initial value of MinV is HV, Var(I, J) is smaller than MinV in the first comparison.

If Var(I, J) is smaller than MinV, the block detection section 25 assigns the value of Var(I, J) to MinV. The block detection section 25 also assigns the value of I to a variable FX that represents displacement of the block separator in the X direction, and assigns the value of J to a variable FY that represents displacement of the block separator in the Y direction. Further, the block detection section 25 assigns the value obtained by rounding off Ave(I, J) to the nearest integer, to n (step 226). Then, the process goes to step 227.

On the other hand, if Var(I, J) is not smaller than MinV, no process is performed and the process goes to step 227.

Then, the block detection section 25 determines as to whether or not I=mx−1 (step 227).

If the block detection section 25 does not determine that I=mx−1, the block detection section 25 adds "1" to I (step 228). Then, the block detection section 25 repeats steps 223 and 224 and compares Var(I, J) with MinV (step 225). If Var(I, J) is smaller than MinV which is the minimum value of Var(I, J) so far, the block detection section 25 assigns Var(I, J) to MinV, assigns the values of I and J at that time to FX and FY, and assigns the value obtained by rounding off Ave(I, J) to the nearest integer to n (step 226). If Var(I, J) is not smaller than MinV, the block detection section 25 determines as to whether or not I=mx−1 (step 227).

On the other hand, when I=mx−1, then the block detection section 25 determines as to whether or not J=my−1 (step 229). If the block detection section 25 does not determine that J=my−1, the block detection section 25 assigns "0" to I and adds "1" to J (step 230). Then, the block detection section 25 repeats such a procedure and detects a minimum value of Var(I, J) ((I, J)=(0, 0) to (mx−1, my−1)).

When the process to I=mx−1, J=my−1 is completed, the block detection section 25 compares the stored MinV with a threshold value TV (step 231). The threshold value TV is a threshold value to prevent variance of the numbers of dots among all blocks from becoming too large.

If MinV is smaller than the threshold value TV, the block detection section 25 fixes the block separator to the position of FX, FY, detects a unit code pattern in each block of the block separator at the position of FX, FY, and converts the unit code pattern into the corresponding pattern value. Each pattern value is stored in a memory as P (X, Y) together with the variables X and Y that identify each block. If the detected unit code pattern cannot be converted into the corresponding pattern value, "−1" is stored in place of the pattern value (step 232).

On the other hand, if MinV is not smaller than the threshold value TV, the block detection section 25 determines that image noise is large and that it is impossible to decode, and outputs information indicating that it is impossible to decode (step 233).

Next, determining of the coding system in the exemplary embodiment will be described with specific examples.

Figure 21:
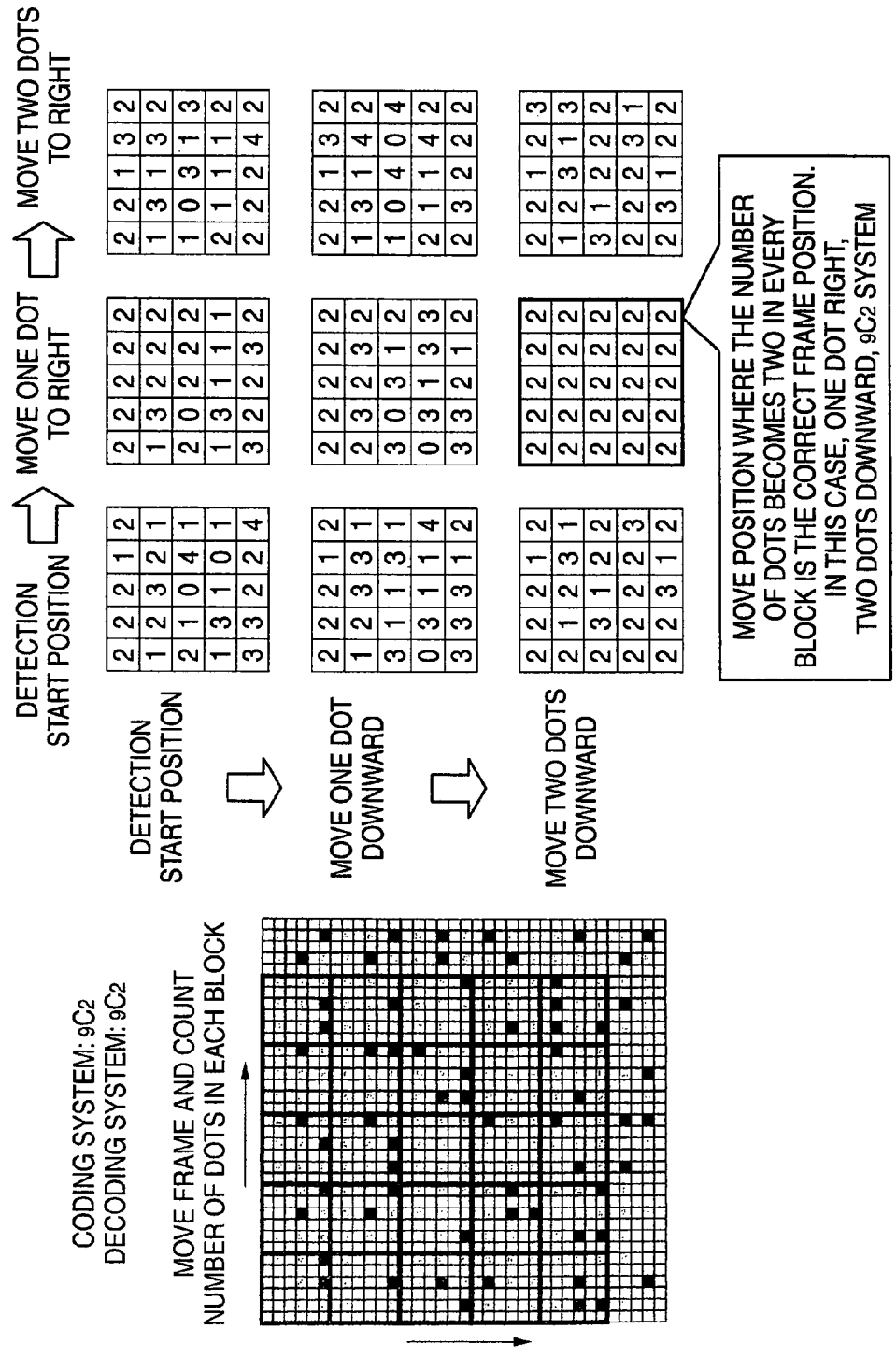
FIG. 21 is a drawing to show a block separator when a $_9C_2$ codes are decoded with the $_9C_2$ system.

FIG. 21 shows an example of the case where the values of m and n are known. The exemplary embodiment is based on the assumption that the value of at least either of m and n is unknown. However, the following process may be performed if the combination of m and n is determined as a single combination with a predetermined accuracy or more, by performing the process shown in FIG. 19. In this case, it is assumed that the values of m and n are known as m=9 and n=2.

In this case, first the block detection section 25 acquires a dot array from the dot array generation section 24. The size of the dot array to be acquired is preset, but corresponds to any selected area of an image. Therefore, the position of a block separator is unknown. Then, the block detection section 25 divides the dot array into blocks with using an end of the dot array as a reference. In this example, since m=9, the block detection section 25 superposes a block separator including blocks each having a size of three dots by three dots. Next, the block detection section 25 counts the number of dots in each block of the block separator. In this example, since n=2, a position of the block separator when two dots exist in each block is the correct separation position. However, in this case, the numbers of dots are different when the block separator is in the initial position, and it is seen that the initial position of the block separator is not the correct position. Then, the block detection section 25 moves the block separator and counts the number of dots in each block of the block separator. That is, the block detection section 25 performs similar operations in the initial position, in the position with one dot moved in the right direction, and in the position with two dots moved in the right direction. For each of these positions, the block detection section 25 performs similar operations in the initial position, in the position with one dot moved in the lower direction, and in the position with two dots moved in the lower direction. As a result, the number of dots in every block becomes "2" and variance of the numbers of dots becomes "0" at the position moved one dot to the right and moved two dots to the bottom from the initial position. Therefore, the block detection section 25 determines that this position is the correct separation position.

Thus, if the combination of m and n is determined to a single combination with the predetermined accuracy in the process shown in FIG. 19, the block detection section 25 may assign the number of blocks in which the number of dots is equal to n to a variable IB(I, J) at step 224 in FIG. 20, assign the maximum value of IB(I, J) to MaxBN at steps 225 to 230, and determine as to whether or not MaxBN is larger than a threshold value TB at step 213.

Figure 22:
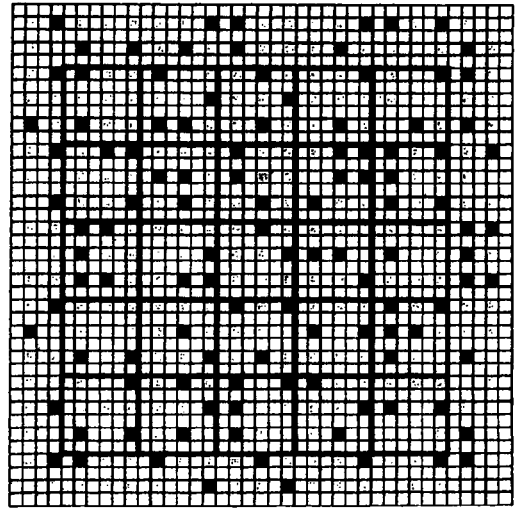
FIG. 22 is a drawing to show a block separator when $_9C_3$ codes are decoded with a $_9C_n$ system.

FIG. 22 shows an example of the case where the value of n is unknown although the value of m is known. It is assumed that the value of m is known as m=9. Thus, a square block separator is used. That is, the block detection section 25 performs the process shown in FIG. 20 with mx=3, my=3, and searches for a block separator where block-to-block variance of the number of dots in each block becomes the minimum. As a result, the number of dots in every block becomes "3" and variance of the numbers of dots becomes "0" at the position moved one dot to the right and moved two dots to the bottom from the initial position of the block separator. Therefore, the block detection section 25 determines that this position is the correct separation position.

However, it is also considered that both the values of m and n are unknown.

In this case, first the dot array generation section 24 performs the process shown in FIG. 19. That is, the dot array generation section 24 calculates the ratio between the total number of elements of the input dot array and the number of actually placed dots. Then, the dot array generation section 24 determines a combination of m and n corresponding to a dot density close to the calculated ratio, from the dot density table shown in FIG. 18.

At this time, the difference combinations of m and n may be close to each other in the dot density.

As an example, the dot density when the $_9C_2$ system is used and the dot density when the $_{12}C_3$ system is used are close values. Depending on the threshold value, theses coding systems may become candidates for the coding system to be found.

For example, it is assumed that the $_9C_2$ system is used for coding.

In this case, as shown in FIG. 21, the correct block separator is found by performing the process shown in FIG. 20 with mx=3, my=3.

Figure 23:
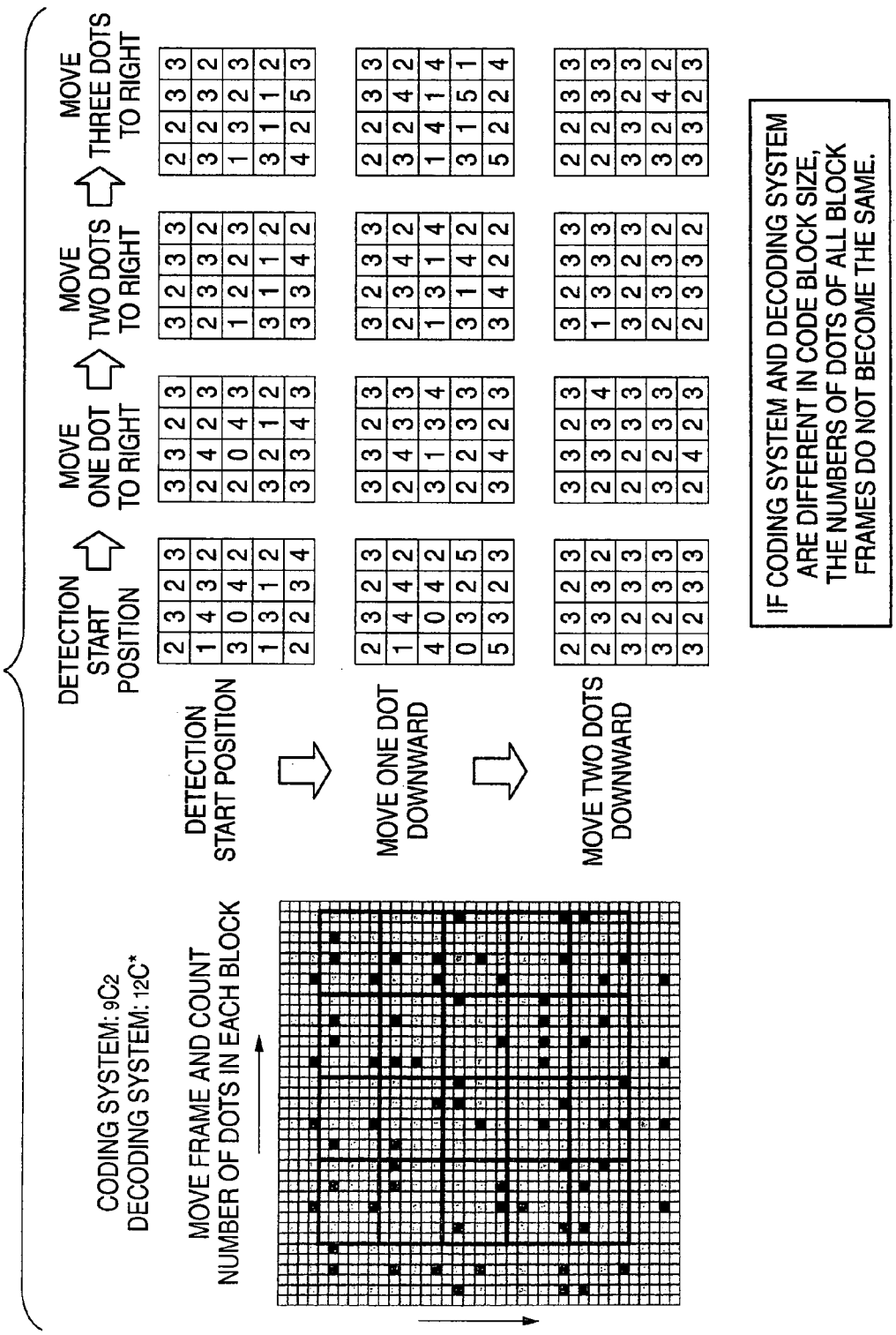
FIG. 23 is a drawing to show a block separator when $_9C_2$ codes are decoded with a $_{12}C_n$ system.

However, for example, if the process shown in FIG. 20 is performed with mx=4, my=3, the correct block separator is not obtained. FIG. 23 shows the state at this time.

The dot density when the $_9C_3$ system is used and the dot density when the $_{12}C_4$ system is used are the same values, and the process shown in FIG. 19 cannot determine which of the dot densities the actual dot density is.

For example, it is assumed that the $_9C_3$ system is used for coding.

In this case, as shown in FIG. 22, the correct block separator is found by performing the process shown in FIG. 20 with mx=3, my=3.

Figure 24:
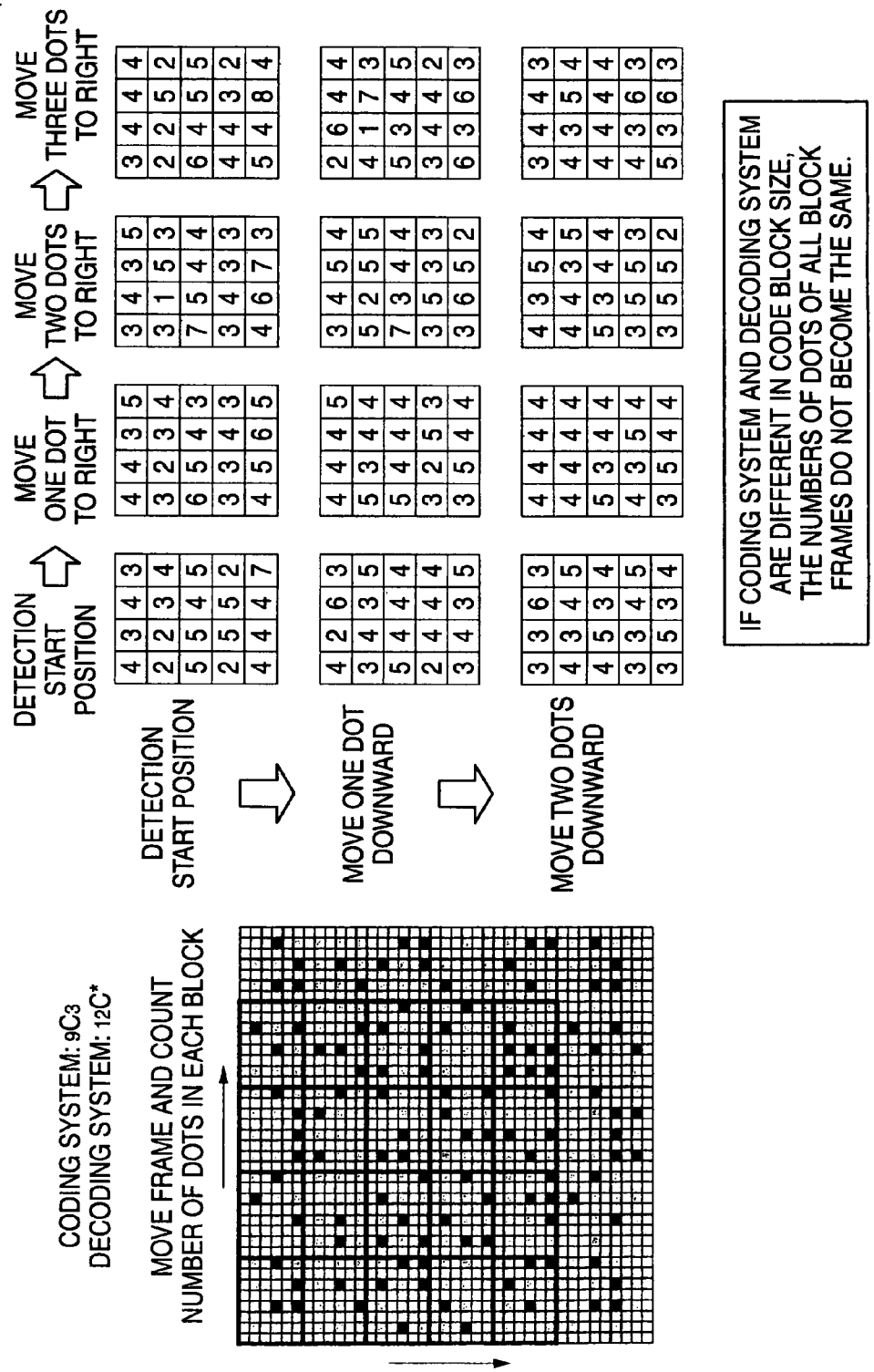
FIG. 24 is a drawing to show a block separator when $_9C_3$ codes are decoded with the $_{12}C_n$ system.

However, for example, if the process shown in FIG. 20 is performed with mx=4, my=3, the correct block separator is not obtained. FIG. 24 shows the state at this time.

On the other hand, it is assumed that the $_{12}C_4$ system is used for coding.

In FIG. 25, the block detection section 25 performs the process shown in FIG. 20 with mx=4, my=3 and searches for a block separator where block-to-block variance of the number of dots in each block becomes the minimum. As a result, the number of dots in every block becomes "4" and variance of the numbers of dots becomes "0" at the position moved one dot to the right and moved two dots to the bottom from the initial position of the block separator. Therefore, the block detection section 25 determines that this position is the correct separation position of the block separator.

Figure 26:
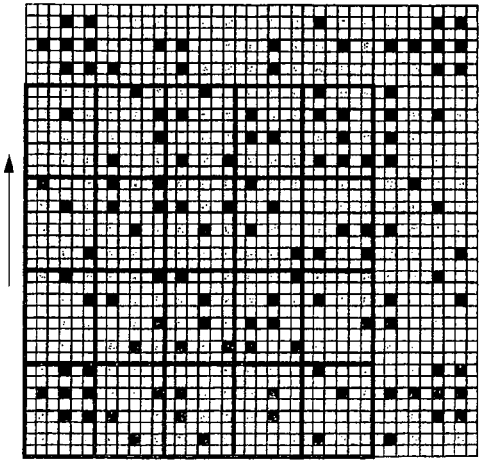
FIG. 26 is a drawing to show a block separator when $_{12}C_4$ codes are decoded with the $_{12}C_n$ system.

FIG. 26 shows an example of the case where the orientation of the input image is rotated 90 degrees. In the example shown in FIG. 26, when each block in the input image is four dots in height by three dots in width, the block detection section 25 performs the process shown in FIG. 20 with mx=4, my=3 and searches for a block separator where block-to-block variance of the number of dots in each block becomes the minimum. In this case, however, the numbers of dots in all blocks do not become the same. Then, the block detection section 25 rotates the dot array 90 degrees and performs the detection process.

Figure 27:
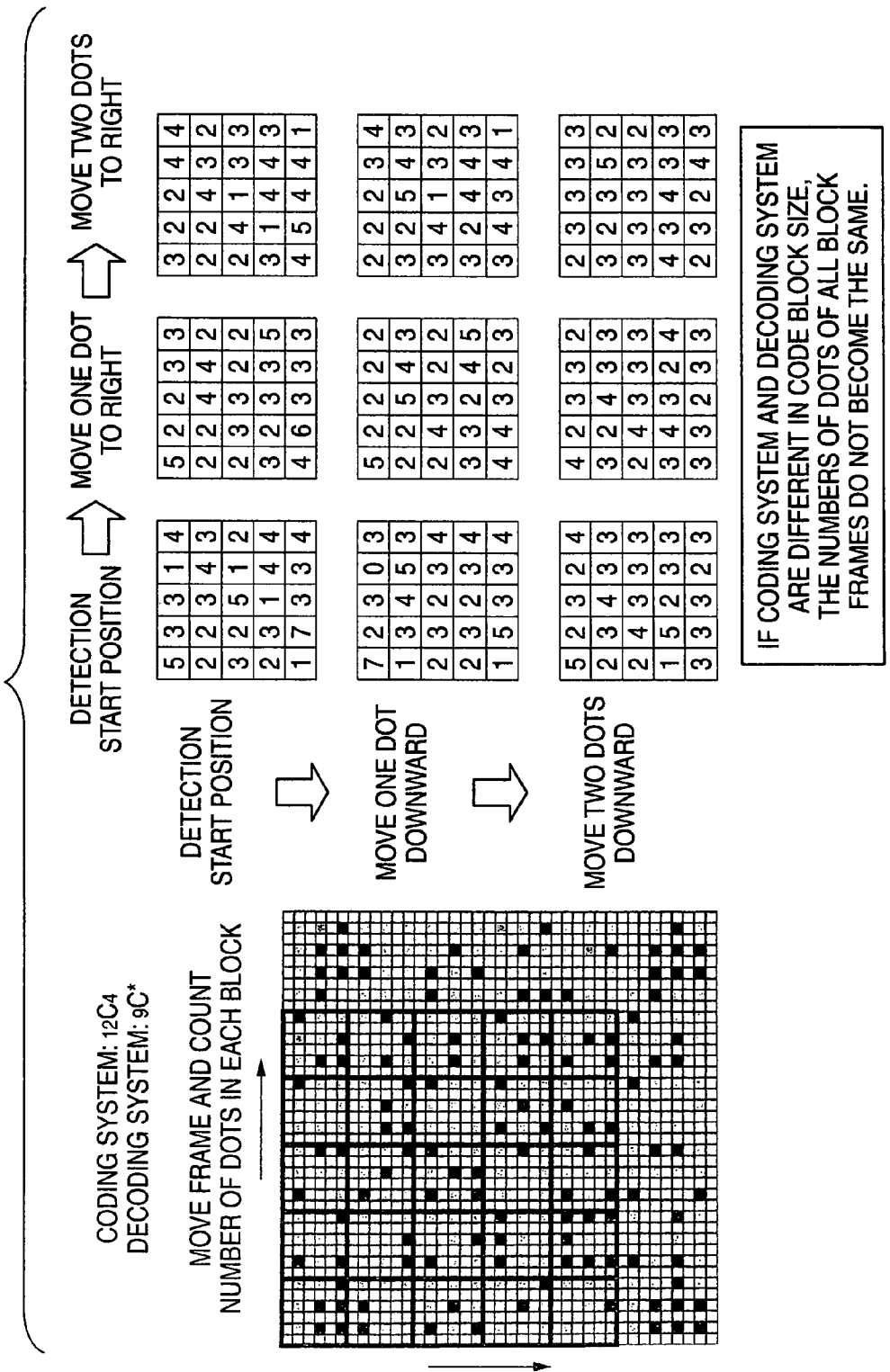
FIG. 27 is a drawing to show a block separator when $_{12}C_4$ codes are decoded with the $_9C_n$ system.

In FIG. 27, the block detection section 25 performs the process shown in FIG. 20 with mx=3, my=3 and searches for a block separator where block-to-block variance of the number of dots in each block becomes the minimum. In this case, however, the numbers of dots in all blocks do not become the same.

Next, the operation for acquiring information from the code array generated by the block detection section 25 with using m and n thus determined will be described. The exemplary embodiment assumes that the image processing apparatus 20 stores the same correspondence information that is referred to in generating the image in the correspondence information storage section (not shown) such as a memory. That is, the correspondence relation between each set of synchronous patterns and a rule which relates to placement of information patterns and which is used when the synchronous patterns belonging to each set may be referred to, if necessary.

First, the operation of detecting a synchronous code, which is required for acquiring information, will be described.

Figure 28:
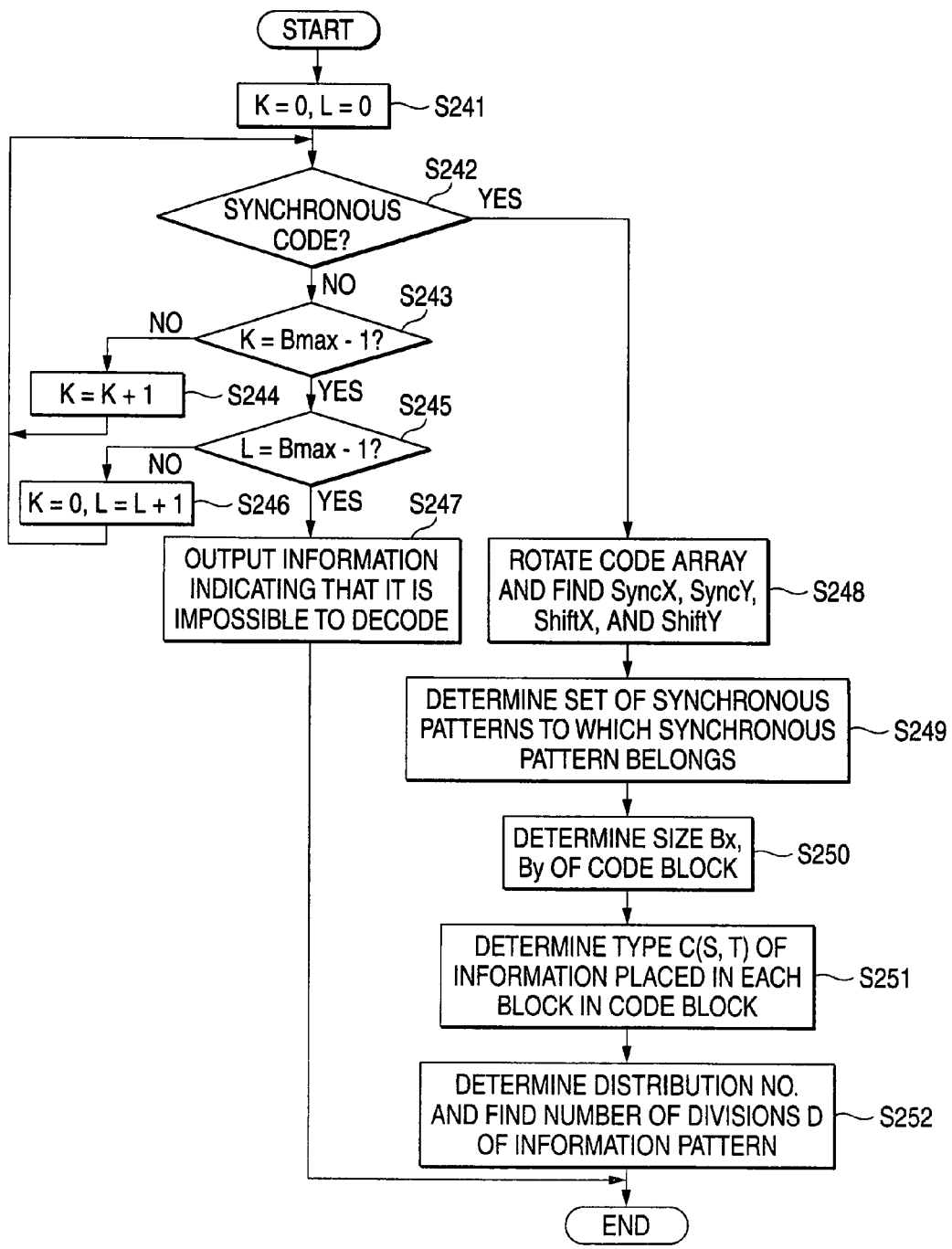
FIG. 28 is a flowchart to show operation of a synchronous code detection section according to the exemplary embodiment of the invention.

FIG. 28 is a flowchart to show the operation of the synchronous code detection section 26 at this time. In the following description, the maximum value of the number of blocks in the X direction contained in a code block and the maximum value of the number of blocks in the Y direction are expressed as Bmax.

The synchronous code detection section 26 first assigns "0" to K and L (step 241). K is a counter indicating the number of blocks in the X direction, and L is a counter indicating the number of blocks in the Y direction.

Next, the synchronous code detection section 26 determines as to whether or not a code corresponding to a synchronous pattern is stored in P(K, L) (step 242). For example, to use the pattern shown in FIG. 11, the synchronous code detection section 26 determines as to whether or not a pattern value of a synchronous pattern that belongs to any of the synchronous pattern groups Q1 to Q5 is stored in P(K, L).

If the synchronous code detection section 26 does not determine that a code corresponding to a synchronous pattern is stored in P(K, L), the synchronous code detection section 26 determines as to whether or not K=Bmax−1 (step 243).

If the synchronous code detection section 26 does not determine that K=Bmax−1, the synchronous code detection section 26 adds "1" to K (step 244) and repeats step 242 until K=Bmax−1. When K=Bmax−1, the synchronous code detection section 26 determines as to whether or not L=Bmax−1 (step 245). If the synchronous code detection section 26 does not determine that L=Bmax−1, the synchronous code detection section 26 assigns "0" to K and adds "1" to L (step 246) and repeats steps 242 to 244 until L=Bmax−1. When L=Bmax−1, this means that a synchronous pattern is not found in the processing target range. Therefore, the synchronous code detection section 26 outputs information indicating that it is impossible to decode (step 247).

If the synchronous code detection section 26 determines that a code corresponding to a synchronous pattern is stored in P(K, L) at step 242, the synchronous code detection section 26 performs the following process.

First, the synchronous code detection section 26 rotates the code array of Bmax×Bmax and finds SyncX, SyncY, ShiftX, and ShiftY (step 248).

SyncX is the X coordinate of a position where the synchronous pattern is placed in the code array of Bmax×Bmax. SyncY is the Y coordinate of the position where the synchronous pattern is placed in the code array of Bmax×Bmax. The upper left corner block is used as a reference for the coordinates in the code array of Bmax×Bmax. That is, if the synchronous pattern exists in the leftmost column, SyncX=0. If the synchronous pattern exists in the rightmost column, SyncX=Bmax−1. SyncX takes any value of 0, 1, 2, . . . , Bmax−1. If the synchronous pattern exists in the top row, SyncY=0. If the synchronous pattern exists in the bottom row, SyncY=Bmax−1. SyncY takes any value of 0, 1, 2, . . . , Bmax−1.

ShiftX is the move distance of the block separator in the X direction. ShiftY is the move distance of the block separator in the Y direction.

Taking the synchronous patterns in the $_9C_2$ system shown in FIG. 9A as an example, the above process is performed as follows.

If the synchronous code detection section 26 detects the synchronous pattern having the pattern value 32, the synchronous code detection section 26 does not rotate the code array and assign K to SyncX, L to SyncY, FX to ShiftX, and FY to ShiftY.

If the synchronous code detection section 26 detects the synchronous pattern having the pattern value 33, the synchronous code detection section 26 rotates the code array left 90 degrees and assigns L to SyncX, Bmax−1−K to SyncY, FY to ShiftX, and 2−FX to ShiftY.

Further, if the synchronous code detection section 26 detects the synchronous pattern having the pattern value 34, the synchronous code detection section 26 rotates the code array 180 degrees and assigns Bmax−1−K to SyncX, Bmax−1−L to SyncY, 2−FX to ShiftX, and 2−FY to ShiftY.

Further, if the synchronous code detection section 26 detects the synchronous pattern having the pattern value 35, the synchronous code detection section 26 rotates the code array left 270 degrees and assigns Bmax−1−L to SyncX, K to SyncY, 2−FY to ShiftX, and FX to ShiftY.

Taking the synchronous patterns in the $_{12}C_2$ system shown in FIG. 9B as an example, the above process is performed as follows.

If the synchronous code detection section 26 detects the synchronous pattern having the pattern value 64, the synchronous code detection section 26 does not rotate the code array and assigns K to SyncX, L to SyncY, FX to ShiftX, and FY to ShiftY.

If the synchronous code detection section 26 detects the synchronous pattern having the pattern value 65, the synchronous code detection section 26 rotates the code array 180 degrees and assigns Bmax−1−K to SyncX, Bmax−1−L to SyncY, 3−FX to ShiftX, and 2−FY to ShiftY.

Next, the synchronous code detection section 26 determines a set to which the detected synchronous pattern belongs (step 249). Taking the case shown in FIG. 11 as an example, the synchronous code detection section 26 determines which of the synchronous pattern groups Q1 to Q5 the detected synchronous pattern belongs to.

The synchronous code detection section 26 determines the size Bx, By of the code block associated with the determined set of synchronous patterns in the correspondence information (step 250). It is assumed that the synchronous pattern groups Q1 and Q2 are associated with the layouts shown in FIGS. 13B and 13C, respectively. In this case, if it is determined at step 249 that the synchronous pattern belongs to the synchronous pattern group Q1, Bx=6, By=6. If it is determined at step 249 that the synchronous pattern belongs to the synchronous pattern group Q2, Bx=4, By=4. It is assumed that the synchronous pattern groups Q1 and Q2 are associated with the layouts shown in FIGS. 14C and 14D, respectively. In this case, if it is determined at step 249 that the synchronous pattern belongs to the synchronous pattern group Q1, Bx=4, By=5. If it is determined at step 249 that the synchronous pattern belongs to the synchronous pattern group Q2, Bx=5, By=6.

Next, the synchronous code detection section 26 determines a type C(S, T) of information placed in each block in the code block (step 251) where S=0, 1, . . . , Bx−1 and T=0, 1, . . . , By−1. It is assumed that the synchronous pattern groups Q1 and Q2 are associated with the layouts shown in FIG. 13C and 13E, respectively. In this case, if it is determined at step 249 that the synchronous pattern belongs to the synchronous pattern group Q1, C(0, 0)="synchronous," C(S, 0)="X position" (where S=1, 2, . . . , 5), C(0, T)="Y position" (where T=1, 2, . . . , 5), and C(S, T)="identification" (where S=1, 2, . . . , 5 and T=1, 2, . . . , 5). If it is determined at step 249 that the synchronous pattern belongs to the synchronous pattern group Q2, C(0, 0)="synchronous," C(S, 0)="identification" (Where S=1, 2, . . . , 5), C(0, T)="identification" (where T=1, 2, . . . , 5), and C(S, T)="identification" (where S=1, 2, . . . , 5 and T=1, 2, . . . , 5).

Last, the synchronous code detection section 26 determines the distribution No. and finds the number of divisions D corresponding to the distribution No. (step 252). For example, it is assumed that pattern distribution methods are defined as shown in FIG. 10. In this case, if it is determined in the process shown in FIG. 19 or 20 that the coding system is the $_9C_2$ system or the $_{12}C_2$ system, the synchronous code detection section 26 refers to the parameter stored in the parameter storage section and determines which of "1," "2," and "3" the distribution No. is. For example, if it is determined that the distribution No. is "2" in the $_9C_2$ system, it is found that the number of divisions D is "2." If it is determined in the process shown in FIG. 19 or 20 that the coding system is any of the $_9C_3$ system, the $_{12}C_3$ system, or the $_{12}C_4$ system, the synchronous code detection section 26 refers to the parameter stored in the parameter storage section and determines which of "1" and "2" the distribution No. is. For example, if it is determined that the distribution No. is "2" in the $_9C_3$ system, it is found that the number of divisions D is "2."

Next, the operation for detecting an identification code and acquiring identification information will be described. In the exemplary embodiment, an embedded additional code may be superposed on an identification code and a position code is also detected in the operation. Therefore, these processes will also be described.

Figure 29:
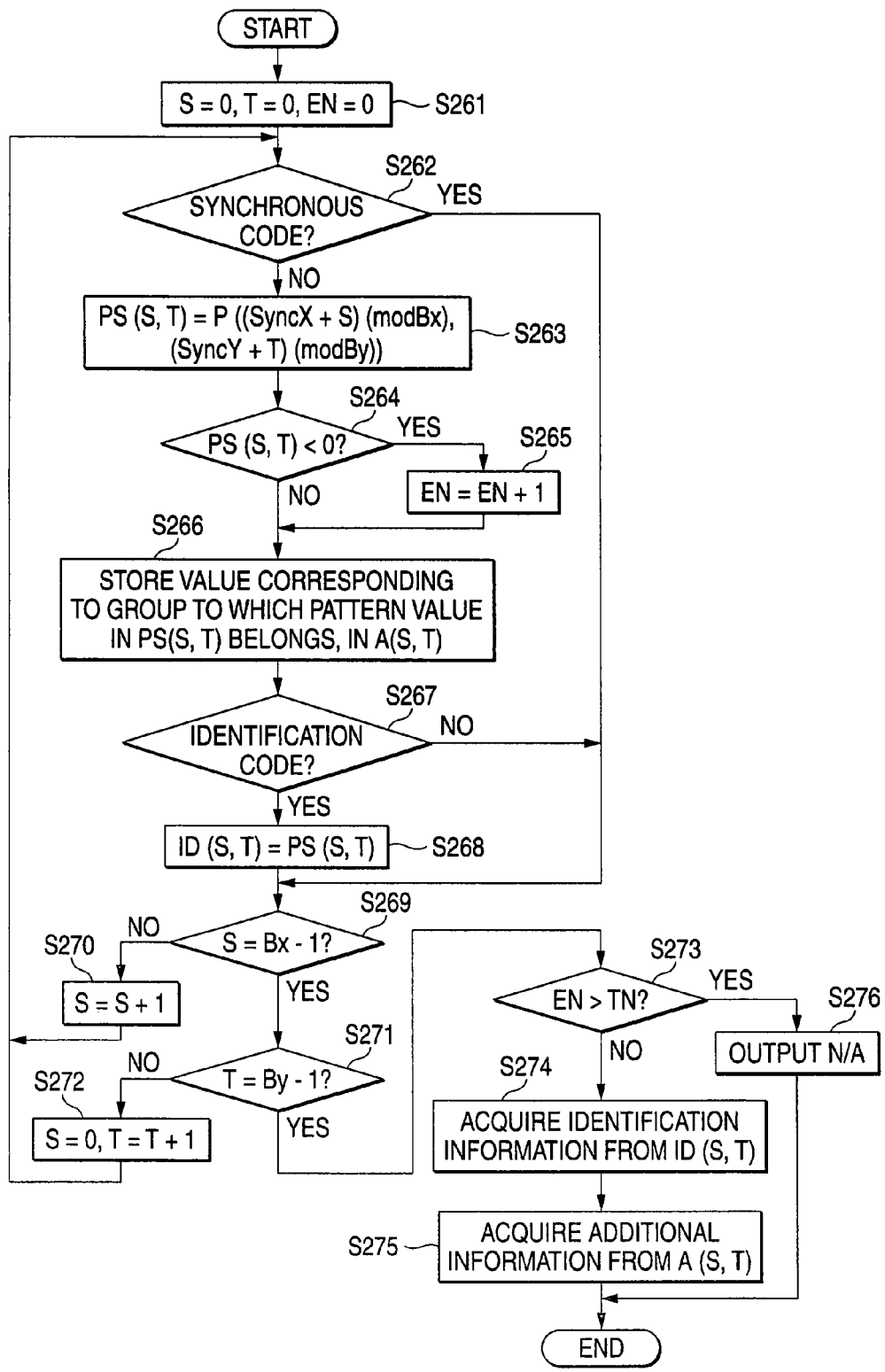
FIG. 29 is a flowchart to show operation of an identification information acquisition section according to the exemplary embodiment of the invention.

FIG. 29 is a flowchart to show the operation of the identification code detection section 27a at this time.

The identification code detection section 27a first assigns "0" to counters S and T that identify each block in a code block of Bx−By, and assigns "0" to a counter EN that counts the number of blocks determined as an error among blocks indicating identification information (step 261). Here, S is a counter that indicates the number of blocks in the X direction, and T is a counter that indicates the number of blocks in the Y direction.

The identification code detection section 27a determines as to whether or not the block identified by S and T contains a synchronous code (step 262). Here, the process starts from the row and the column where a synchronous code is placed. That is, it is determined as to whether or not the block whose X coordinate is (SyncX+S) (modBx) and whose Y coordinate is (SyncY+T) (modBy) contains a synchronous code. Specifically, it is determined as to whether or not C((SyncX+S) (modBx), (SyncY+T) (modBy)) is "synchronous.".

If it is determined that a synchronous code is placed in the block, the block is not a block from which identification information is to be extracted and is not a block in which additional information is embedded. Therefore, the process goes to step 269.

On the other hand, if it is not determined that a synchronous code is placed in the block, there is a possibility that at least an additional code may be embedded. Therefore, the identification code detection section 27a extracts the corresponding pattern value from the code array generated by the block detection section 25.

Here, the identification code detection section 27a extracts the pattern value stored in P ((SyncX+S) (modBx), (SyncY+T) (modBy)) and assigns the pattern value to PS (S, T) (step 263).

Next, the identification code detection section 27a determines as to whether or not the pattern value stored in PS(S, T) is smaller than "0" (step 264).

If the corresponding pattern value cannot be obtained from the detected unit code pattern at step 232 in FIG. 20, "−1" is stored in PS(S, T) . Then, the pattern value in PS(S, T) read from a memory is compared with "0," to thereby determine as to whether or not the unit code pattern is a unit code pattern determined as normal.

If the pattern value is smaller than "0," the identification code detection section 27a adds "1" to the counter EN for counting the number of blocks determined as an error (step 265).

On the other hand, if the pattern value is not smaller than "0," the identification code detection section 27a determines a group to which the information pattern having the pattern value stored in PS(S, T) belongs, and stores a value associated with the group in A(S, T) (step 266). The identification code detection section 27a determines as to whether or not an identification code is placed in the block (step 267). Specifically, it is determined as to whether or not C((SyncX+S) (modBx), (SyncY+T) (modBy)) is "identification." As a result, if an identification code is placed in the block, the identification code detection section 27a assigns the value stored in PS(S, T) to ID(S, T) to store the identification code (step 268), and goes to step 269. If an identification code is not placed, a position code is placed in the block. Thus, the identification code detection section 27a goes to step 269 without assigning to ID(S, T).

Next, the identification code detection section 27a determines as to whether or not S=Bx−1 (step 269).

If it is not determined that S=Bx−1, the identification code detection section 27a adds "1" to S (step 270) and repeats steps 262 to 268 until S=Bx−1. When S=Bx−1, then the identification code detection section 27a determines as to whether or not T=By−1 (step 271). If it is not determined that T=By−1, the identification code detection section 27a assigns "0" to S and adds "1" to T (step 272) and repeats steps 262 to 270 until T=By−1. When T=By−1, the identification code detection section 27a determines as to whether or not the value of the counter EN that counts the number of errors is larger than a threshold value TN (step 273). The threshold value TN indicates allowable number of errors per code block. As the threshold value TN, a uniform value may be preset without considering the layouts of the code blocks or the number of blocks where an identification code is placed in each code block, multiplied by a given ratio may be adopted.

If the value of the counter EN is smaller than the threshold value TN, the identification code decoding section 27b decodes the identification code stored in ID (S, T) and acquires identification information (step 274). The identification code decoding section 27b also decodes the additional code stored in A(S, T) and acquires additional information (step 275).

On the other hand, if the value of the counter EN is larger than the threshold value TN, it is determined that error occurrence frequency is high and normal decoding cannot be performed. N/A (not applicable) is output as identification information and additional information (step 276).

Next, the operation for detecting a position code and acquiring position information will be described. For position information, since X position information and Y position information are coded using the M sequences, a layout where an X position code and a Y position code are placed linearly and intersect each other at the position of the synchronous code may be adopted. Then, in the following description, it is assumed that the X position code is placed in the same row as the synchronous code.

Figure 30:
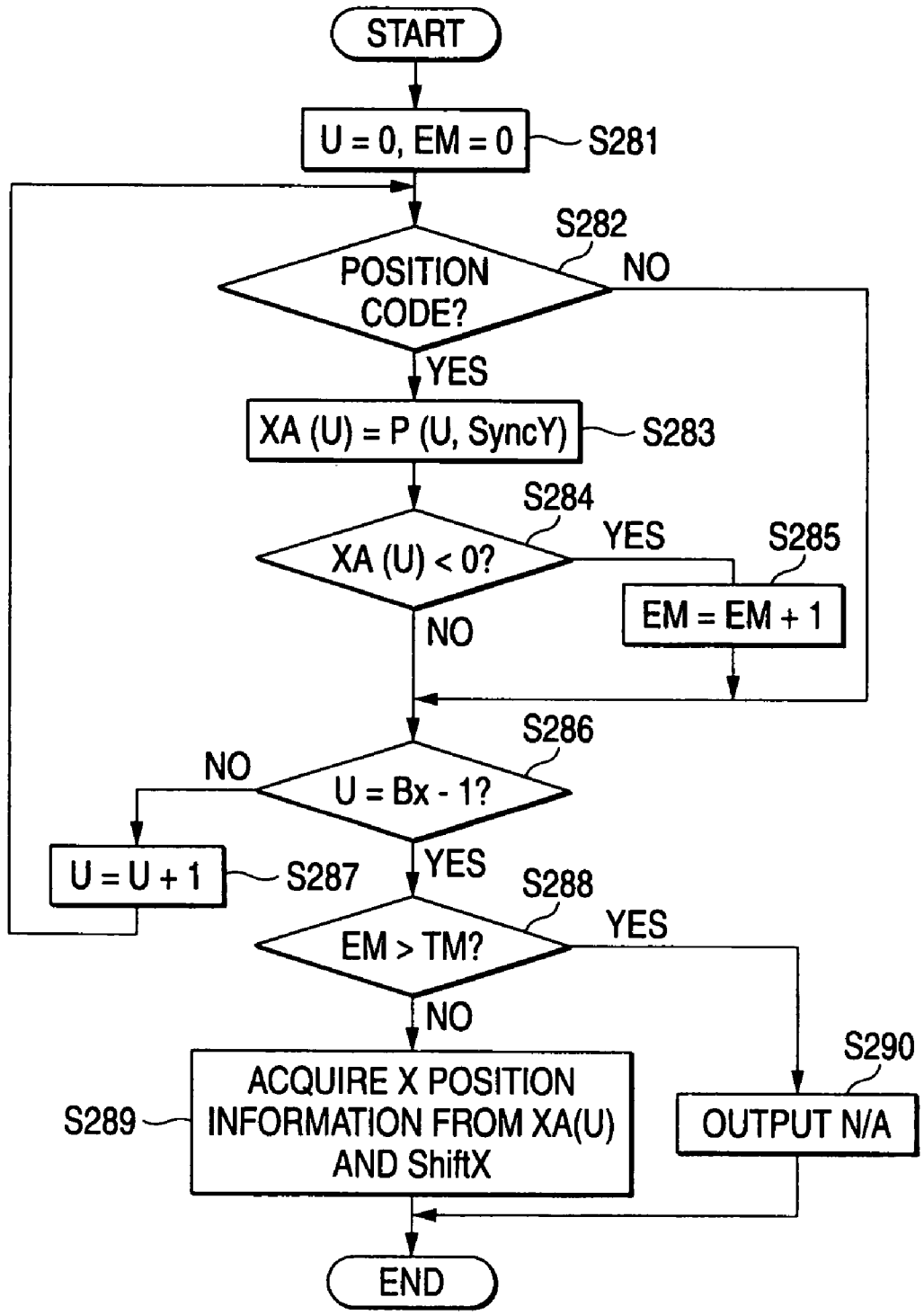
FIG. 30 is a flowchart to show operation of a position information acquisition section according to the exemplary embodiment of the invention.

FIG. 30 is a flowchart to show the operation of the position code detection section 28a at this time.

The position code detection section 28a first assigns "0" to a counter U that counts the number of blocks in the X direction and assigns "0" to a counter EM that counts the number of blocks determined as an error among blocks indicating position information (step 281).

The position code detection section 28a determines as to whether or not the block determined by U contains an X position code (step 282). Specifically, it is determined as to whether or not C(U, SyncY) is "X position."

If it is not determined that a position code is placed in the block, the process goes to step 286.

On the other hand, if it is determined that a position code is placed in the block, the position code detection section 28a extracts a corresponding pattern value from the code array generated by the block detection section 25.

Here, the position code detection section 28a extracts a pattern value stored in P(U, SyncY) and assigns the pattern value to XA(U) (step 283).

Next, the position code detection section 28a determines as to whether or not the pattern value stored in XA(U) is smaller than "0" (step 284).

If the corresponding pattern value cannot be obtained from the detected unit code pattern at step 232 in FIG. 20, "−1" is stored in XA(U). Then, the pattern value in XA (U) read from the memory is compared with "0," to thereby determine as to whether or not the unit code pattern is a unit code pattern determined as normal.

If the pattern value is not smaller than "0," the process goes to step 286.

On the other hand, if the pattern value is smaller than "0," the position code detection section 28a adds "1" to the counter EM for counting the number of blocks determined an error (step 285) and goes to step 286.

Next, the position code detection section 28a determines as to whether or not U=Bx−1 (step 286).

If it is not determined that U=Bx−1, the position code detection section 28a adds "1" to U (step 287) and repeats steps 282 to 285 until U=Bx−1. When U=Bx−1, the position code detection section 28a determines as to whether or not the value of the counter EM that counts the number of errors is larger than a threshold value TM (step 288). The threshold value TM indicates allowable number of errors per code block. As the threshold value TM, a uniform value may be preset without considering the layouts of the code blocks or the number of blocks where a position code is placed in each code block, multiplied by a given ratio may be adopted.

If the value of the counter EM is smaller than the threshold value TM, the position code detection section 28a acquires X position information from XA(U) and ShiftX (step 289). In this case, since no pattern value is stored in XA (SyncX), it is necessary to remove it and join the remaining XA(U).

On the other hand, if the value of the counter EM is larger than the threshold value TM, it is determined that the error occurrence frequency is high and normal decoding cannot be performed. Then, N/A (not applicable) is output as position information (step 290).

The operation for detecting a Y position code and acquiring Y position information is also similar to the operation described above and therefore will not be described again in detail.

By the way, the image processing in the exemplary embodiment is performed on the assumption that the values of m and n are unknown, and the values of m and n are determined before information coded in the $_mC_n$ system is acquired. However, information may be acquired according to a similar method in a state where the values of m and n are already determined.

Next, an electronic pen 60 to which the image processing apparatus 20 may be applied will be described.

Figure 31:
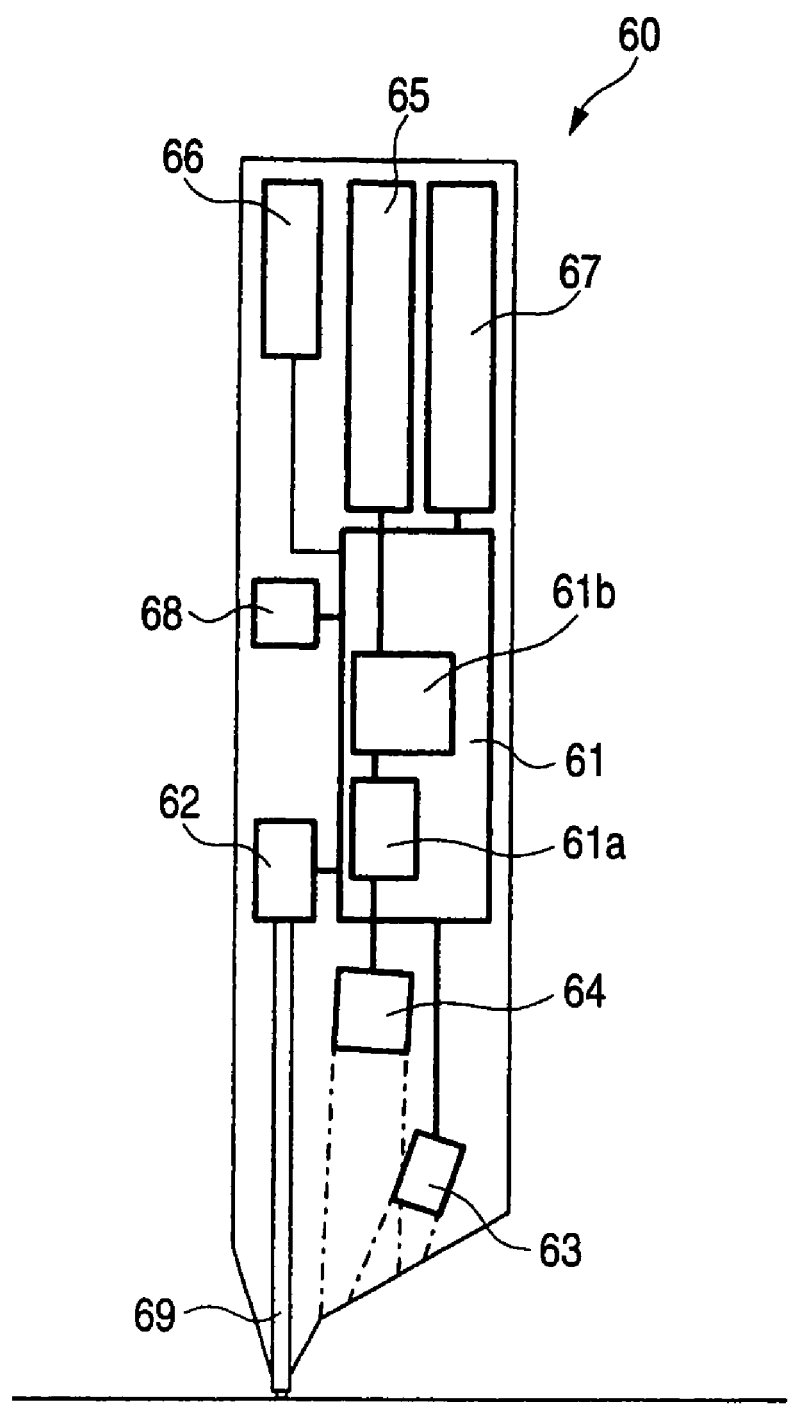
FIG. 31 is a drawing to show the mechanism of an electronic pen to which the exemplary embodiment of the invention may be applied.

FIG. 31 is a drawing to show the mechanism of the electronic pen 60.

As shown in FIG. 31, the electronic pen 60 includes a control circuit 61 for controlling the operation of the whole pen. The control circuit 61 includes an image processing section 61a for processing a code image detected from an input image and a data processing section 61b for extracting identification information and position information from the processing result of the image processing section 61a.

A pressure sensor 62 for detecting the writing operation with the electronic pen 60 according to the pressure applied to a pen tip 69 is connected to the control circuit 61. An infrared LED 63 for applying infrared radiation onto a medium and an infrared CMOS 64 for inputting an image are also connected to the control circuit 61. Further, also connected to the control circuit 61 are information memory 65 for storing identification information and position information, a communication circuit 66 for communicating with an external unit, a battery 67 for driving the pen, and pen ID memory 68 for storing identification information of the pen (pen ID).

The image reading section 21 shown in FIG. 17 is implemented as the infrared CMOS 64 in FIG. 31, for example. The noise removal section 22, the dot image detection section 23, and the dot array generation section 24 shown in FIG. 17 are implemented as the image processing section 61a in FIG. 31, for example. Further, the block detection section 25, the synchronous code detection section 26, the identification information acquisition section 27, and the position information acquisition section 28 shown in FIG. 17 are implemented as the data processing section 61b in FIG. 31, for example.

The image generation apparatus 10 is implemented as a computer part of an image formation apparatus such as a server computer, a client computer, or a printer, for example. On the other hand, the image processing apparatus 20 is implemented not only as the electronic pen 60, but also as a computer part of an image reader such as a scanner, for example. Then, each of the image generation apparatus 10 and the image processing apparatus 20 is implemented as a general computer 90 and the hardware configuration of the computer 90 will be described.

Figure 32:
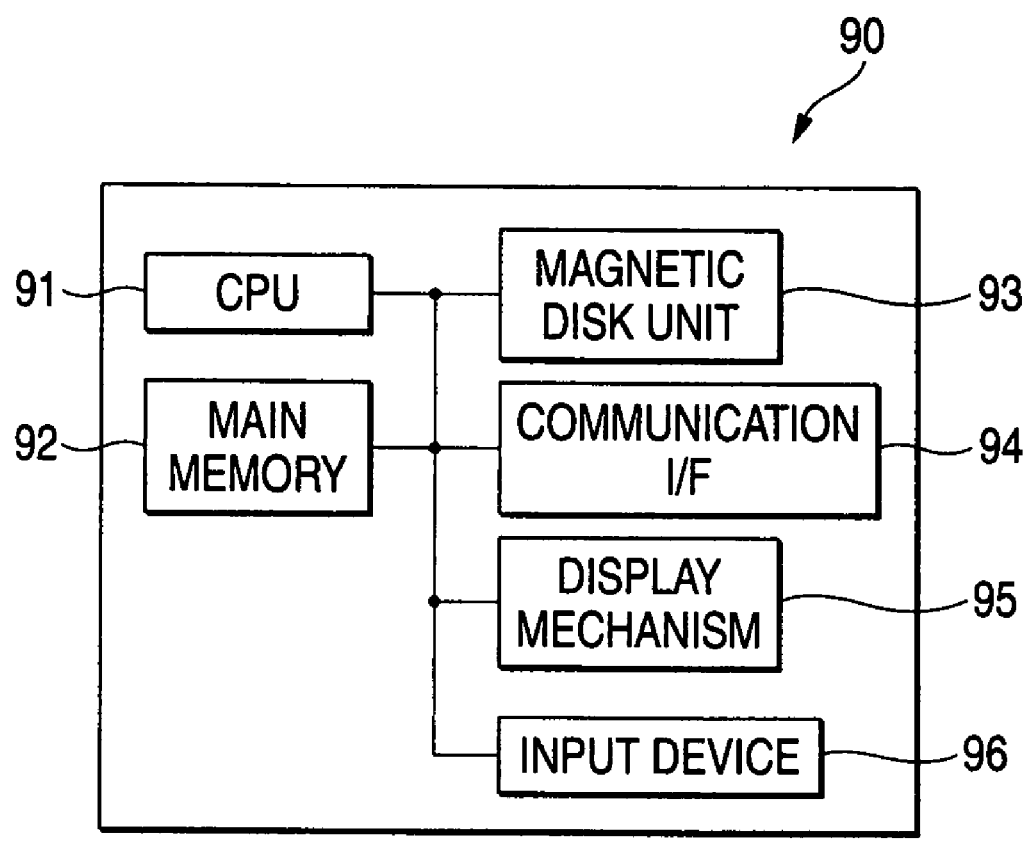
FIG. 32 is a block diagram to show the hardware configuration of a computer to which the exemplary embodiment of the invention may be applied.

FIG. 32 is a block diagram to show the hardware configuration of the computer 90.

As shown in the figure, the computer 90 includes a CPU (Central Processing Unit) 91 of computation means and main memory 92 and a magnetic disk unit (HDD: Hard Disk Drive) 93 of storage means. The CPU 91 executes OS (Operating System) and various software programs of applications, etc., and realizes the functions described above. The main memory 92 is a storage area for storing various software programs and data used for execution of the software, and the magnetic disk unit 93 is a storage area for storing input data to various software programs, output data from various software programs, and the like.

The computer 90 further includes a communication I/F 94 for conducting external communications, a display mechanism 95 made up of video memory, a display, etc., and input devices 96 of a keyboard, a mouse, etc.

The program for implementing the exemplary embodiment can be provided not only by communication means, but also by a recording medium such as a CD-ROM storing the program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image generation apparatus having a CPU comprising:
   an acquisition unit of the CPU that acquires information to be embedded in each of a plurality of partitions on a recording medium; and
   a generation unit of the CPU that generates an image in which first pattern images representing the information and a second pattern image controlling acquisition of the information from the first pattern images are placed in each of the plurality of partitions, the first and second pattern images being ones of $_mC_n$ pattern images which are obtained by placing a unit image in n points selected from among m points where m and n are natural numbers, m≧4, and 2≦n<m,
   wherein the first and second pattern images are placed in each of the plurality of partitions on the recording medium, and
   wherein:
   m is a square number,
   the second pattern image is one selected from among 4q pattern images, of the $_mC_n$ pattern images, for detecting rotation of the partitions, and
   the first pattern images is ones selected from among $2^p$ pattern images of the $_mC_n$ pattern images except the 4q pattern images, where p and q are natural numbers satisfying $2^p+4q \leq {_mC_n}$.

2. An image generation apparatus having a CPU comprising:
   an acquisition unit of the CPU that acquires information to be embedded in each of a plurality of partitions on a recording medium; and
   a generation unit of the CPU that generates an image in which first pattern images representing the information and a second pattern image controlling acquisition of the information from the first pattern images are placed in each of the plurality of partitions, the first and second pattern images being ones of $_mC_n$ which are obtained by placing a unit image in n points selected from among m points where m and n are natural numbers, m≧4, and 2≦n<m,
   wherein the first and second pattern images are placed in each of the plurality of partitions on the recording medium, and
   wherein:
   m is a product of two different integers,
   the second pattern image is one selected from among 2q pattern images, of the $_mC_n$ pattern images, for detecting rotation of the partitions, and
   the first pattern images are ones selected from among $2^p$ pattern images of the $_mC_n$ pattern images except the 2q pattern images, where p and q are natural numbers satisfying $2^p+2q \leq {_mC_n}$.

3. An image processing apparatus having a CPU comprising:
   an image acquisition unit of the CPU that acquires an image from a recording medium on which formed is the image containing first pattern images representing information and a second pattern image controlling acquisition of the information; and
   an information acquisition unit of the CPU that acquires the information represented by the first pattern images contained in the image, based on the second pattern image contained in the image acquired by the image acquisition unit, wherein:

the second pattern image belongs to any of a plurality of pattern image groups, the plurality of pattern image groups are respectively associated with rules relating to placement of the first pattern images, and the information acquisition unit determines the pattern image group to which the second pattern image belongs, and acquires the information in accordance with the rule associated with the determined pattern image group, wherein the image includes the first pattern images and the second pattern image which are selected from among $_mC_n$ pattern images obtained by placing a unit image in n points selected from among m points where m and n are natural numbers, $m \geq 4$, and $2 \leq n < m$, and the first and second pattern images are placed in each of the plurality of partitions on the recording medium.

4. The apparatus according to claim 3, wherein the rule relates to at least one of a size of each partition and types of information placed in respective positions of each partition.

5. The apparatus according to claim 3, wherein the rule relates to a method of selecting the first pattern images from the plurality of pattern image groups.

6. The apparatus according to claim 3, wherein:

the image is formed with an invisible image formation material having an absorption wavelength in an infrared region, and the information acquisition unit applies infrared light to the recording medium to acquire the image.

7. A non-transitory computer readable medium storing a program causing a computer to execute a process for generating an image, the process comprising:

acquiring information to be embedded in each of a plurality of partitions on a recording medium; and generating the image in which first pattern images representing the information and a second pattern image controlling acquisition of the information from the first pattern images are placed in each of the plurality of partitions, the first and second pattern images being ones of $_mC_n$ pattern images which are obtained by placing a unit image in n points selected from among m points where m and n are natural numbers, $m \geq 4$, and $2 \leq n < m$, wherein the first and second pattern images are placed in each of the plurality of partitions on the recording medium, and wherein:

m is a square number, the second pattern image is one selected from among 4q pattern images, of the $_mC_n$ pattern images, for detecting rotation of the partitions, and the first pattern images is ones selected from among $2^p$ pattern images of the $_mC_n$ pattern images except the 4q pattern images, where p and q are natural numbers satisfying $2^p + 4q \leq {_mC_n}$.

8. A non-transitory computer readable medium storing a program causing a computer to execute image processing, the image processing comprising:

acquiring an image from a recording medium on which formed is the image containing first pattern images representing information and a second pattern image controlling acquisition of the information; and acquiring the information represented by the first pattern images contained in the image, based on the second pattern image contained in the acquired image, wherein:

the second pattern image belongs to any of a plurality of pattern image groups, and the plurality of pattern image groups are respectively associated with rules relating to placement of the first pattern images, the image processing further comprising:

determining the pattern image group to which the second pattern image belongs; and acquiring the information in accordance with the rule associated with the determined pattern image group, wherein the image includes the first pattern images and the second pattern image which are selected from among $_mC_n$ pattern images obtained by placing a unit image in n points selected from among m points where m and n are natural numbers, $m \geq 4$, and $2 \leq n < m$, and the first and second pattern images are placed in each of the plurality of partitions on the recording medium.

9. A non-transitory computer readable medium storing a program causing a computer to execute a process for generating an image, the process comprising:

acquiring information to be embedded in each of a plurality of partitions on a recording medium; and generating the image in which first pattern images representing the information and a second pattern image controlling acquisition of the information from the first pattern images are placed in each of the plurality of partitions, the first and second pattern images being ones of $_mC_n$ pattern images which are obtained by placing a unit image in n points selected from among m points where m and n are natural numbers, $m \geq 4$, and $2 \leq n < m$, wherein the first and second pattern images are placed in each of the plurality of partitions on the recording medium, and wherein:

m is a product of two different integers, the second pattern image is one selected from among 2q pattern images, of the $_mC_n$ pattern images, for detecting rotation of the partitions, and the first pattern images are ones selected from among $2^p$ pattern images of the $_mC_n$ pattern images except the 2q pattern images, where p and q are natural numbers satisfying $2^p + 2q \leq {_mC_n}$.

* * * * *